(12) United States Patent
Locascio et al.

(10) Patent No.: US 11,082,811 B2
(45) Date of Patent: Aug. 3, 2021

(54) IDENTIFYING DECISIONS AND RENDERING DECISION RECORDS IN A GROUP-BASED COMMUNICATION INTERFACE

(71) Applicant: Slack Technologies, Inc., San Francisco, CA (US)

(72) Inventors: Andrew Locascio, San Francisco, CA (US); Matthew Crocker, San Francisco, CA (US); Ohjoong Kwon, Sunnyvale, CA (US); Shiranka Arsiri Miskin, Mountain View, CA (US); Machisté Naóri Quintana, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/941,127

(22) Filed: Jul. 28, 2020

(65) Prior Publication Data
US 2021/0037353 A1    Feb. 4, 2021

Related U.S. Application Data

(60) Provisional application No. 62/880,344, filed on Jul. 30, 2019.

(51) Int. Cl.
*H04W 4/10* (2009.01)
*H04L 29/06* (2006.01)
*H04L 29/08* (2006.01)

(52) U.S. Cl.
CPC .............. *H04W 4/10* (2013.01); *H04L 67/02* (2013.01); *H04L 67/10* (2013.01); *H04L 67/42* (2013.01); *H04L 69/329* (2013.01)

(58) Field of Classification Search
CPC ......... H04L 67/42; H04L 67/10; H04L 67/02; H04L 69/329; H04W 4/10
See application file for complete search history.

(56) References Cited

U.S. PATENT DOCUMENTS

| | | | |
|---|---|---|---|
| 10,848,445 B1* | 11/2020 | Willmann | H04L 51/32 |
| 2014/0038549 A1* | 2/2014 | Lehane | H04W 24/02 |
| | | | 455/406 |
| 2017/0235848 A1* | 8/2017 | Van Dusen | G06F 16/904 |
| | | | 705/12 |
| 2018/0287982 A1 | 10/2018 | Draeger et al. | |
| 2019/0028419 A1* | 1/2019 | Sullivan | H04L 51/04 |
| 2020/0412735 A1* | 12/2020 | Suhail | H04L 63/105 |

OTHER PUBLICATIONS

"Die, Email, Diet a Flickr Cofounder Aims to Cut Us All Some Slack", Readwriteweb, Lexisnexis, www.advance.lexis.com/api/permalink/33dd79e2-90f5-409d-ae27-5a2c7e86bf31/?context=1000516. (dated Aug. 14, 2013, 4:15 PM) 2 pages.

(Continued)

*Primary Examiner* — El Hadji M Sall
(74) *Attorney, Agent, or Firm* — Morrison & Foerster LLP

(57) ABSTRACT

Provided are methods and apparatuses configured to programmatically generate and provide group-based communication decision records to a client device associated with one or more group-based communication feeds.

20 Claims, 15 Drawing Sheets

(56) References Cited

OTHER PUBLICATIONS

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, Lexisnexis, www.advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up the Slack", TEDIUM, [online][retrieved May 9, 2019]. Retrieved from the Internet: www.tedium.co/2017/10/17/irc-vs-slack-chat-history/. (dated Oct. 17, 2017) 13 pages.

Internet Relay Chat, Wikipedia, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", Gigaom, Lexisnexis, www.advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (BITS), Lexisnexis, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: www.rfc-editor.org/rfc/rfc1459.txt. (dated May 1993) 57 pages.

Rebecca Walberg, "Email biggest office waste of time: survey", National Post, At FP10, Lexisnexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

1400 parsing one or more of a plurality of group-based communication messages to identify one or more decisions, wherein the plurality of group-based communication messages is associated with a group-based communication feed and is associated with a group identifier
1402 based on the one or more decisions, generating and transmitting a request for confirming the one or more decisions to one or more client devices associated with the select group-based communication feed
1404 receiving a response from the one or more client devices, wherein the response comprises an approval of the request
1406 storing a record of the one or more decisions
1408 transmitting, for display by each of the client devices, a first summary interface to each of the client devices associated with the group-based communication feed, wherein the first summary interface includes the one or more decisions associated with the record
1410

FIG. 14

IDENTIFYING DECISIONS AND RENDERING DECISION RECORDS IN A GROUP-BASED COMMUNICATION INTERFACE

CROSS-REFERENCE TO RELATED APPLICATIONS

This application claims the priority of U.S. Provisional Application No. 62/880,344, filed Jul. 30, 2019, the entire contents of which are incorporated herein by reference.

BACKGROUND

Various messaging systems are available that allow users to have continuous conversations electronically between each other. Each day, users may be flooded with messages. Applicant has identified a number of deficiencies and problems associated with conventional messaging systems. For example, within a communication system, numerous decisions may be made throughout a day. Thus, it would be desirable to communicate or highlight the decisions made to users involved in the conversation or users associated with the conversation and, in some instances, automatically trigger follow-up actions or tasks.

BRIEF SUMMARY

In general, embodiments of the present invention provided herein include methods, apparatus, and computer program products for generating and transmitting group-based communication decision records in a group-based communication system.

In some embodiments, provided is an apparatus including at least one processor and at least one memory including computer program code, the at least one memory and the computer program code configured to, with the at least one processor, cause the apparatus to parse one or more of a plurality of group-based communication messages to identify one or more decision identifiers, wherein each group-based communication message of the plurality of group-based communication messages is associated with a select group-based communication feed and is associated with a group identifier; based on the one or more decision identifiers, generate and transmit a decision record request to one or more client devices associated with the select group-based communication feed, receive a group-based communication decision record response from the one or more client devices, wherein the group-based communication decision record response comprises an approval of a group-based communication decision record; store the group-based communication decision record in the at least one memory; and transmit a group-based communication decision summary interface to each of the client devices associated with the select group-based communication feed, wherein the decision summary interface is renderable for display by each of the client devices and is associated with the group-based communication decision record.

In some embodiments, the group-based communication decision summary interface may include a user-engageable link to access the plurality of group-based communication messages in the select group-based communication feed.

In some embodiments, the select group-based communication feed may include a group-based communication thread disposed in a first display pane within the group-based communication interface, wherein the group-based communication decision summary interface is renderable for display in a group-based communication channel in a second display pane.

In some embodiments, the select group-based communication feed may include a group-based communication channel disposed in a first display pane within the group-based communication interface and the group-based communication decision summary interface may be renderable for display in a summary pane as a second display pane.

In some embodiments, the plurality of group-based communication messages may be associated with a channel identifier, a select topic, a participant status, or combinations thereof.

In some embodiments, the at least one memory and the computer program code may be further configured to, with the at least one processor, cause the apparatus to parse a second group-based communication message to identify one or more second decision identifiers, wherein the second group-based communication message may be associated with the plurality of group-based communication messages such that the second group-based communication message is associated with the select group-based communication feed; based on the one or more second decision identifiers, generate and transmit a second decision record request to one or more client devices associated with the select group-based communication feed; receive a second group-based communication decision record response from the one or more client devices, wherein the second group-based communication decision record response comprises an approval of a second group-based communication decision record; store the second group-based communication decision record in the at least one memory; and transmit a second group-based communication decision summary interface to each of the client devices associated with the select group-based communication feed, wherein the second decision summary interface is renderable for display by each of the client devices and is associated with the second group-based communication decision record.

In some embodiments, the at least one memory and the computer program code may be further configured to, with the at least one processor, cause the apparatus to determine a participant status of one or more of the client devices associated with the select group-based communication feed; and based on the participant status of the one or more client devices associated with the select group-based communication feed, select the one or more client devices to which the decision record request is transmitted. In some embodiments, analyzing the plurality of group-based communication messages to identify one or more decision identifiers is based at least in part on the participant status of one or more of the client devices associated with the select group-based communication feed.

In some embodiments, the at least one memory and the computer program code may be further configured to, with the at least one processor, cause the apparatus to based on a decision identifier associated with the group-based communication decision record, generate a decision data structure, wherein the decision data structure comprises instructions for creating one or more work objects and instructions for transmitting the one or more work objects to a client device associated with the group-based communication interface. In some embodiments, the one or more work objects may include one or more of a file, a group-based communication channel, a thread, a communication message, a user identifier, an event occurrence data structure, an email, or a task list. In some embodiments, the one or more work objects may include an internal work object comprising one or more of a file, a call, a task, an event, a message, a notification, an internal calendar event, an internal contact, an internal directory, or an internal directory entry.

In some embodiments, the group-based communication decision record may be associated with a group-based communication system and comprises one or more of a group-based communication channel identifier, thread identifier, or group identifier.

In some embodiments, the at least one memory and the computer program code may be further configured to, with the at least one processor, cause the apparatus to identify one or more decision identifiers after a predetermined period of time following receipt of the plurality of group-based communication messages.

In some embodiments, the one or more decision identifiers may include data stored in the group-based communication system indicating that a decision has been made.

In some embodiments, the at least one memory and the computer program code may be further configured to, with the at least one processor, further cause the apparatus to in response to receiving a remove request from one or more of the client devices, remove at least a portion of the group-based communication decision record. In some embodiments, the at least one memory and the computer program code may be further configured to, with the at least one processor, further cause the apparatus to in response to receiving an add request from one or more of the client devices, replace the group-based communication decision record with a second group-based communication decision record.

Some embodiments are directed to an apparatus including at least one processor and at least one memory including computer program code for one or more programs, the at least one memory and the computer program code configured to, with the at least one processor, cause the apparatus to parse one or more of a plurality of group-based communication messages to identify one or more decision identifiers, wherein each group-based communication message of the plurality of group-based communication messages is each associated with a select group-based communication feed; based on the one or more decision identifiers, generate and transmit a decision record request to one or more client devices associated with the select group-based communication feed; receive a group-based communication decision record response from the one or more client devices, wherein the group-based communication decision record response comprises an approval of a group-based communication decision record; store the group-based communication decision record in the at least one memory, wherein the group-based communication decision record is associated with a decision workflow; and in response to storing the group-based communication decision record, cause the transmission of a work object to one or more validated external resources, wherein the work object is associated with the decision workflow.

An exemplary method for identifying decisions and rendering decision records in a group-based communication interface, comprises: parsing one or more of a plurality of group-based communication messages to identify one or more decisions, wherein the plurality of group-based communication messages is associated with a group-based communication feed and is associated with a group identifier; based on the one or more decisions, generating and transmitting a request for confirming the one or more decisions to one or more client devices associated with the select group-based communication feed; receiving a response from the one or more client devices, wherein the response comprises an approval of the request; storing a record of the one or more decisions; and transmitting, for display by each of the client devices, a first summary interface to each of the client devices associated with the group-based communication feed, wherein the first summary interface includes the one or more decisions associated with the record.

In some embodiments, the group-based communication feed comprises a group-based communication channel displayed in a first display pane within the group-based communication interface and the group-based communication decision summary interface is displayed in a summary pane as a second display pane.

In some embodiments, the method further comprises: parsing a second group-based communication message to identify one or more second decisions, wherein the second group-based communication message is associated with the plurality of group-based communication messages such that the second group-based communication message is associated with the group-based communication feed; based on the one or more second decisions, generating and transmitting a second request for confirming the one or more second decisions to one or more client devices associated with the group-based communication feed; receiving a second response from the one or more client devices, wherein the second response comprises an approval of the second request; storing a second record of the one or more second decisions; and transmitting, for display by each of the client devices, a second summary interface to each of the client devices associated with the group-based communication feed, wherein the second summary interface includes the one or more decisions associated with the second record.

In some embodiments, analyzing the plurality of group-based communication messages to identify one or more decisions is based at least in part on the participant status of one or more of the client devices associated with the group-based communication feed.

In some embodiments, the method further comprises: in response to receiving a remove request from one or more of the client devices, removing at least a portion of the record.

In some embodiments, the method further comprises: in response to receiving an add request from one or more of the client devices, replacing the record with a second record, wherein the add request includes a request to add data to the record.

In some embodiments, the record is associated with a decision workflow and the method further comprises: in response to storing the record of the one or more decisions, causing the transmission of a work object to one or more validated external resources, wherein the work object is associated with the decision workflow.

An exemplary, non-transitory computer-readable storage medium stores one or more programs, the one or more programs comprising instructions, which when executed by one or more processors of an electronic device cause the electronic device to: parse one or more of a plurality of group-based communication messages to identify one or more decisions, wherein the plurality of group-based communication messages is associated with a group-based communication feed and is associated with a group identifier; based on the one or more decisions, generate and transmit a request for confirming the one or more decisions to one or more client devices associated with the select group-based communication feed, receive a response from the one or more client devices, wherein the response comprises an approval of the request; store a record of the one or more decisions; and transmit, for display by each of the client devices, a first summary interface to each of the client devices associated with the group-based communication feed, wherein the first summary interface includes the one or more decisions associated with the record.

In some embodiments, the group-based communication feed comprises a group-based communication channel displayed in a first display pane within the group-based communication interface and the group-based communication decision summary interface is displayed in a summary pane as a second display pane.

In some embodiments, analyzing the plurality of group-based communication messages to identify one or more decisions is based at least in part on the participant status of one or more of the client devices associated with the group-based communication feed.

In some embodiments, the one or more programs comprise instructions, which when executed by one or more processors of an electronic device further cause the electronic device to: in response to receiving a remove request from one or more of the client devices, remove at least a portion of the record.

In some embodiments, the one or more programs comprise instructions, which when executed by one or more processors of an electronic device further cause the electronic device to: in response to receiving an add request from one or more of the client devices, replace the record with a second record.

In some embodiments, the record is associated with a decision workflow and the one or more programs comprise instructions, which when executed by one or more processors of an electronic device further cause the electronic device to: in response to storing the record of the one or more decisions, cause the transmission of a work object to one or more validated external resources, wherein the work object is associated with the decision workflow.

BRIEF DESCRIPTION OF THE FIGURES

Reference will now be made to the accompanying drawings, which are not necessarily drawn to scale, and wherein:

FIG. 14 illustrates an exemplary method for identifying decisions and rendering decision records in a group-based communication interface in accordance with some embodiments discussed herein.

DETAILED DESCRIPTION

Figure 1:
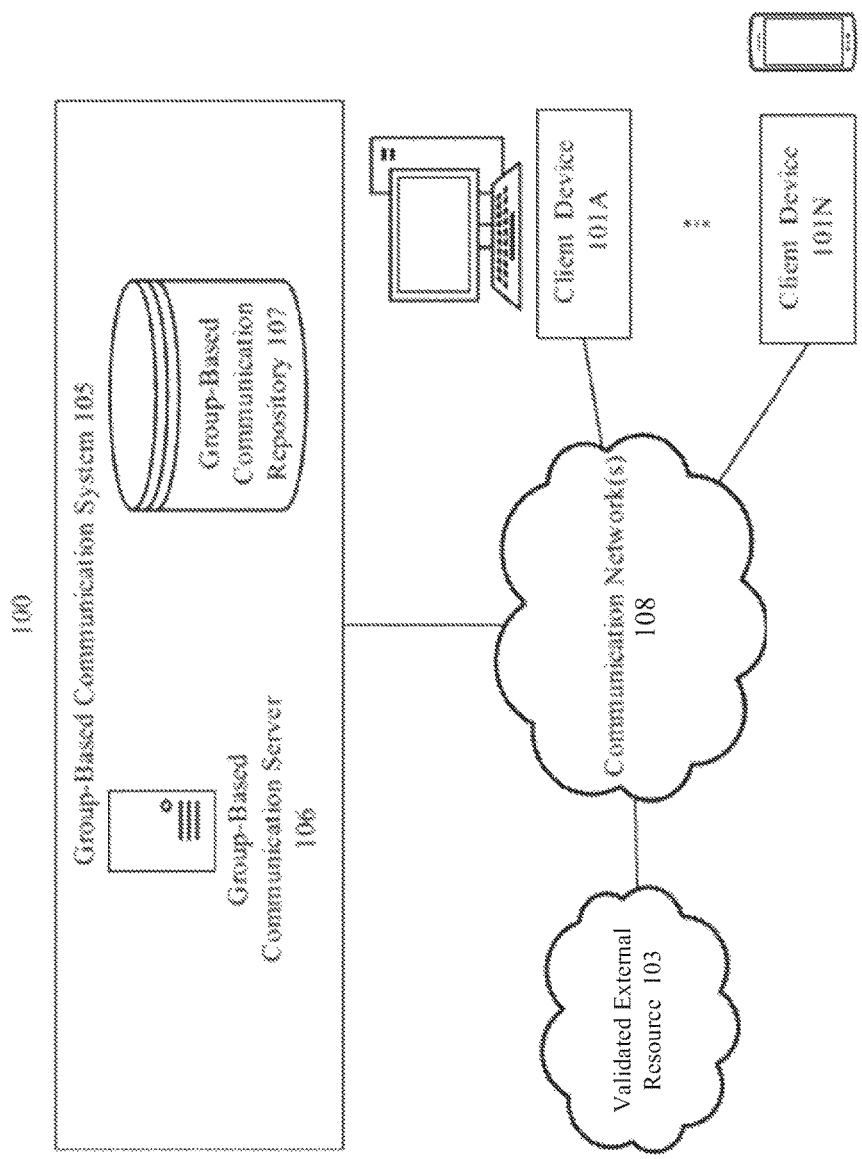
FIG. 1 illustrates an example group-based communication system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Discussed herein methods, apparatus, systems, computing devices, computing entities, and/or the like for a group-based communication system for generating, storing, and/or transmitting group-based communication decision records to various devices/entities associated with a group-based communication feed. In some embodiments, the group-based communication system is a channel-based messaging platform. The group-based communication feed can include a digital rendering of group-based communication channel interfaces, threads within group-based communication channel interfaces, group-based communication messages within group-based communication channel interfaces, and the like.

Within a group-based communication system, numerous decisions may be made throughout a day. Each conversation may result in a decision that needs to be communicated to others or highlighted such that users involved in the conversation or users associated with the conversation are aware of such decision. Further, some decisions may trigger the performance of an action or task or complete tasks within a workflow. The present group-based communication system may identify decisions in a plurality of group-based communication messages and generate and store a decision record indicating that a decision has been made. In some embodiments, in response to a decision record being generated, a decision summary interface may be transmitted to one or more client devices associated with the select group-based communication feed for display. The group-based communication decision summary interface may be displayed without the display of each of the plurality of group-based communication messages associated with the group-based communication decision record. The group-based communication system may thereby display relevant data without expending the network resources to display each of the messages that culminated in the group-based communication decision record.

In some embodiments, the generation of the decision record may initiate the creation of a data object (e.g., work object) that is then transmitted to one or more client devices and/or validated external resources. As decision records are generated and stored, workflow may progress in the group-based communication system without the user needing to access the validated external resource. For instance, as a result of a decision record being created, an email may be sent to an external sales group for purchasing equipment. Such email may be sent without accessing the external sales group's application. The group-based communication system may initiate the creation of emails, events, audio files, video files, document files, spreadsheet files, presentation files, tasks, etc., or combinations thereof in an automated workflow. In some embodiments, the group-based communication system may identify participant status of one or more client devices and use such participant status in formulating and transmitting decision record requests and group-based communication decision records. By identifying one or more participant statuses, the group-based communication system may provide the most relevant and confident group-based communication decision record.

In some embodiments, the group-based communication system may aggregate a plurality of relevant group-based communication decision summary interfaces to transmit and display on a group-based communication interface. The plurality of group-based communication decision summary interfaces may be generated based on user preferences, user interests, participant status, or other data particular to a client device to provide the most relevant group-based communication decision records to a particular client device.

In some embodiments, the group-based communication system may transmit a decision record request after a predetermined period of time has passed since receipt of the last group-based communication message in the group-based communication feed. The group-based communication system can thereby trigger the creation of a decision record and/or a group-based communication summary interface to provide relevant information to the participating client devices as well as other client devices.

In some embodiments, the group-based communication system may continue to receive group-based communication messages, analyze the group-based communication messages, and identify subsequent decision identifiers. The group-based communication system may update or replace group-based communication decision records with new group-based communication decision records and/or a group-based communication summary interface thereby providing the most relevant information without expending unnecessary network resources showing all prior decision records.

Each client device of a group-based communication system is typically associated with a plurality of group-based communication channels and threads and interacts with a plurality of files, other users of the group-based communication system, emails hosted by validated external resources, and other forms of data objects. Each group-based communication channel receives potentially a flurry of communication messages on a daily basis which can contain extensive data, resulting in the transfer of large amounts of data, even potentially redundant data. The data transfers require data storage (i.e., memory on the client device), transmission bandwidth, processing power (i.e., retrieval and conversion to appropriate packets for transmission by a server to the client device), and time.

Accordingly, the present disclosure provides a technological improvement that results in minimizing the amount of data transmitted to and from devices and computing entities within a group-based communication system, while also ensuring the most important and/or relevant data is prioritized for consumption in an interface at the desired time. In certain embodiments, one or more group-based communication decision records may be generated via a group-based decision record system specifically customized to a user of the client device's preferences and made accessible to the client device. The client device thereby receives curated, relevant information at the desired time, rather than locally storing numerous files, communication messages, or emails, and manually scavenging this information. When downloading the group-based communication decision record, over, for example, a restricted bandwidth network, download times can be minimal due to the reduced volume of data. Thus, the group-based decision record system of the present disclosure provides savings in memory, transmission/network bandwidth, processing power, and time.

The selected group-based communication interface may be used as part of a standalone service, application, or device or it may be applied as a layer atop an existing service application or device.

In some embodiments, the selected group-based communication interface may be configured to be used by a business, organization, team, or other group of individuals and may be tailored to suit the respective group's interests or specific data needs. One of ordinary skill in the art will appreciate that the concepts discussed herein may be applied to efficiently organize group-based messaging communications on a selected group-based communication interface and notify relevant users of decisions when determined on the selected group-based communication interface.

Exemplary Architecture & Apparatuses

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows system 100 including an example network architecture for a system, which may include one or more devices and sub-systems that are configured to implement some embodiments discussed herein. Users may access a group-based communication system 105 and/or a validated external resource 103 via a communications network 108 using any one or more of a plurality of client devices 101A-101N. The group-based communication system 105 may comprise a group-based communication server 106 in communication with at least one group-based communication repository 107. For example, system 100 may include group-based communication system 105 which includes group-based communication server 106, which can include, for example, the circuitry disclosed in FIGS. 2, 3A, and 3B, a server, or database, among other things (not shown) and group-based communication repository 107, which can include, for example, the circuitry disclosed in FIGS. 2, 3A, and 3B, a server, or database, among other things (not shown). The group-based communication server 106 may include any suitable network server and/or other type of processing device. In some embodiments, the group-based communication server 106 may determine and transmit commands and instructions for generating a group-based communication decision record, a group-based communication summary interface, one or more decision data structures, or work objects to client devices 101A-101N using data from the decision record database 210 and the generated queries to the decision record database 210 and decision record system 214.

In some embodiments, a group-based system, channel, message, or virtual environment is one that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

In some embodiments, a group-based communication channel includes a virtual communications environment or feed that is configured to display communication messages posted by channel members (e.g., validated users accessing the environment using client devices) that are viewable only to the members of the group. The format of the group-based communication channel may appear differently to different users of the group-based communication channel; however, the content of the group-based communication channel (i.e., communication messages) will be displayed to each member of the group-based communication channel. For instance, a common set of group-based communication messages will be displayed to each member of the respective group-based communication channel such that the content of the group-based communication channel (i.e., communication messages) will not vary per member of the group-based communication channel.

The format of the group-based communication channel may appear differently to different members of the group-based communication channel; however, the content of the group-based communication channel (i.e., communication messages) may be displayed to each member of the group-based communication channel. For instance, in one embodiment, a common set of group-based communication messages will be displayed to each member of the respective group-based communication channel such that the content of the group-based communication channel (i.e., communication messages) will not vary per member of the channel. However, in another embodiment, a member may join a group-based communication channel and only be able to view subsequent group-based communication messages (as opposed to historical group-based communication messages). The group-based communication channels are generally topic-oriented, long-lasting channels as opposed to ad hoc ephemeral conversations in conventional messaging apps.

In some embodiments, a group-based communication message can include any electronically generated digital content object provided by a user that has security sufficient such that it is accessible only to a defined group of users and that is configured for display within a group-based communication channel. Communication messages may include any text, image, video, audio, or combination thereof provided by a user (using a client device). For instance, the user may provide a communication message that includes text as well as an image and a video within the communication message as message contents. In such a case, the text, image, and video would comprise the communication message or digital content object. Each message sent or posted to a group-based communication channel of the group-based communication system includes metadata comprising the following: a timestamp associated with post of the message, a sending user identifier, a message identifier, message contents, a group identifier, a group-based communication channel identifier, a thread identifier, and the like. Each of the foregoing identifiers may comprise ASCII text, a pointer, a memory address, and the like.

In some embodiments, a thread is a collection of communication messages displayed to a subsidiary feed arising from or otherwise associated with a selected group-based communication message displayed in a selected group-based communication channel. A thread may include one or more "threaded messages" or "thread communication messages" that are linked together in the subsidiary feed, wherein each is associated with the selected group-based communication message. In some embodiments, a file thread request may be received. The file thread request may request the creation of a file thread. The file thread request may include a thread communication message or may initiate a thread in which a thread communication message is then received. A "file thread" refers to a thread created from the sharing of a file (generally referred to as a "file share"). A single file may be shared multiple times with each instance of sharing being referred to as a unique file share. Each file share is initiated by a unique file share request and leads to the generation and display of a unique file summary avatar and which may be presented with an introductory Communication message unique to the file share request.

In some embodiments, the communication message information can include any information associated with the communication message, such as information related to the user who created the communication message, the group-based communication channel on which the communication message was first provided (e.g., the name of the group-based communication channel), the time and date that the communication message was first provided, subsequent reproductions of the communication message (e.g., date, time, name of the receiver channel, etc. of such reproduction), and any other identifying information related to the communication message.

In some embodiments, a group-based communication interface includes a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined herein.

A group-based communication interface can be a user interface of the group-based communication system and has security sufficient such that it is accessible only to a defined group of users. As discussed herein, access may be facilitated by a group-based communication interface invitation to join transmitted by one group member user to another non-member user. As used herein, a "group-based communication interface account" is a designation to which messages may be delivered in the group-based communication system and associated with the respective group-based communication interface. The group-based communication interface account may have an identifier, referred to as a group-based communication identifier, which identifies the group-based communication interface account and may comprise ASCII text, a pointer, a memory address, and the like. For instance, the group-based communication interface identifier may be an email address (e.g., comprising a local-part, an @ symbol, then a case-insensitive domain).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of communication messages organized among a plurality of group-based communication channels, and/or the like.

Information associated with one or more decision identifiers may be drawn from the group-based communication repository 107, and then, in light of the information, one or more queries are generated and used to generate and transmit a group-based communication decision record, a group-based communication summary interface, one or more decision data structures, or one or more work objects. The queries may be altered based on information received from a user input, a user request, a user identifier or the like.

In some embodiments, the decision identifiers include one or more items of data by which a decision may be uniquely identified. For example, a decision identifier may comprise a graphical identifier, ASCII text, a pointer, a memory address, and the like that has been stored in the group-based communication system as indicating a decision may have been made. The group-based communication system may parse text strings contained within a communication message, file, or any other data or collection of data capable of being transmitted, received, and/or stored. For example, the message may be parsed using a machine learning technique, such as topic modeling (e.g., Latent Dirichlet allocation topic modeling), to identify decision identifiers indicating that a decision has been made.

In some embodiments, a graphical identifier includes any visual icon, avatar, image, video, photo, or graphic that may be used to label, tag, or otherwise distinguish a selected communication message. In some embodiments, the graphical identifier may provide a visual illustration of a sentiment or emotion that a user may wish to associate with a selected communication message. For instance, the graphical identifier may be an emoji or an emoticon or other similar expressive visual identification means. In some embodiments, the graphical identifier may be animated, such as to illustrate movement between a first state and a second state when displayed within the selected group-based communication interface. For instance, the graphical identifier may be a series of images of a gavel that when run in sequence illustrate the movement of a gavel knocking against a desk. The animated gavel may then be used in communication messages that include final decisions as an indicator that such a decision was made.

In some embodiments, a file includes a packet of data treated as a unit, such as a web page (e.g., .htm, .html, etc.), pdf (e.g., .pdf), graphic or photo (e.g., .jpg, .jpeg, etc.), Microsoft Word document (e.g., .doc, .docx, etc.), Microsoft Excel file (e.g., .xls, .xlsx, .xlsm, .xlsb, etc.), Box file, Dropbox file, Google Drive file, etc. and may store pictures, words, videos, computer programs, and combinations thereof. The files may be uploaded to the group-based communication interface or may be cloud or remotely stored files (e.g., GoogleDoc, GitHub, etc.) and app session pointers. That is, the files may be stored to a memory or database associated with the group-based communication system and/or may be stored to a memory or database associated with a third party event scheduling resource (e.g., a software program, application, platform, service, etc. that is configured to communicate with the group-based communication system for providing service to a client device via a group-based communication interface). In some embodiments, the file may be stored to a remove data object address, which may be a uniform resource locator (URL), an internet address, or an intranet domain.

In some embodiments, a request includes an instruction or direction, generally initiated by a client device associated with user, for an action to take place. The request may be initiated by the group-based communication server for the client device to act on. For instance, the request may be to create a thread (e.g., thread request), view a summary of threads the user follows (e.g., thread summary view request), view profile data of another user, view certain communication message information, share a select thread communication message from a thread to the selected group-based communication channel from which the thread was created (e.g., broadcast request), receive notifications regarding a thread (e.g., follow request), notify a selected member of a thread communication message (e.g., follow request), share a file (e.g., file share request), reply to a shared file (e.g., file thread request), edit an introductory message to a shared file (e.g., introductory communication message edit request), view information regarding each instance a file was shared (e.g., file detail request), delete a shared file (e.g., file share delete request), change the information regarding a file (e.g., file update request), view specific instances where a file was shared (e.g., selected file thread view request), view a selected group-based communication feed request (e.g., group-based communication feed request, or more specifically selected channel view request, selected thread view request), generate or approve a decision record (e.g., decision record request), etc.

In some embodiments, a user profile, user account, and user account details can refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, user interest indicators, and the like. The user account details can include a subset designation of user credentials, such as, for example, login information for the user including the user's username and password. For example, and without limitation, a user identifier may include a unique graphical identifier (e.g., an avatar), an IP address, a MAC address, and the like. A user can include an individual, group of individuals, business, organization, and the like; the users referred to herein are accessing a group-based communication or messaging system using client devices.

Group-based communication server 106 can communicate with one or more client devices 101A-101N via communication network 108. In this regard, communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers configured to perform functions as described herein. The group-based communication server 106 may provide for receiving of electronic data from various sources, including but not necessarily limited to the client devices 101A-101N, and the validated external resource 103. For example, the group-based communication server 106 may be operable to receive and post or transmit group-based messaging communications provided by any one or more of the plurality of client devices 101A-101N. Further, for example, the group-based communication server 106 may be operable to generate a group-based communication decision record, a group-based communication summary interface, one or more decision data structures, or one or more work objects in cooperation with the validated external resource 103.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

Client devices 101A-101N and/or group-based communication server 106 may each be implemented as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 1 of client devices 101A-101N is merely for illustration purposes. Any number of users may be included in the system 100 so long as the users have the proper credentials for accessing the selected group-based communication interface. In one embodiment, the client devices 101A-101N may be configured to display an interface on a display of the client device for viewing, creating, editing, and/or otherwise interacting with a group-based communication decision record, a group-based communication summary interface, one or more decision data structures, or one or more work objects. According to some embodiments, the group-based communication server 106 may be configured to display the interface on a display of the group-based communication server 106 for viewing, creating, editing, and/or otherwise interacting with a group-based communication decision record, a group-based communication summary interface, one or more decision data structures, or one or more work objects. In some embodiments, an interface of a client device 101A-101N may be different from an interface of a group-based communication server 106. The client devices 101A-101N may be used in addition to or instead of the group-based communication server 106. System 100 may also include additional client devices and/or servers, among other things. Additionally or alternatively, the client device 101A-101N may interact with the group-based communication system 105 via a web browser. As yet another example, the client device 101A-101N may include various hardware or firmware designed to interface with the system 100.

In embodiments where a client device 101A-101N is a mobile device, such as a smart phone or tablet, the client device 101A-101N may execute an "app" to interact with the system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

In some embodiments, client device 101A-101N refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The validated external resource 103 may be embodied as a computer or computers as described herein. The validated external resource 103 may provide for receiving of electronic data from various sources, including but not necessarily limited to the client devices 101A-101N and group-based communication server 106. For example, a client device 101A-101N and group-based communication server 106 may access a third party event scheduling application or email application provided by the validated external resource 103 to execute functions, flows, or actions associated with an event occurrence as per the decision data structure. In such a configuration, the validated external resource 103 may be operable to receive an event occurrence creation request or an email creation request from a client device 101A-101N and/or group-based communication server 106 and send an event occurrence creation confirmation or email creation confirmation to one or more of the plurality of client devices 101A-101N and group-based communication server 106 in response. The event occurrence or email may then be transmitted and displayed by one or more client devices 101A-101N and/or the group-based communication server 106.

Further, with regards to the event occurrence, the validated external resource 103 may be operable to send any event occurrence invites to any one or more of the plurality of client devices 101A-101N associated with one or more event occurrence invitee identifiers and receive any event occurrence acceptances or event occurrence declines from the one or more of the plurality of client devices 101A-101N associated with one or more event occurrence invitee identifiers. In various embodiments, for example, the validated external resource 103 may be configured to store historical event occurrence attendance data associated with the event occurrence invitee identifiers. In such a configuration, the validated external resource 103 may be operable to send the historical event occurrence attendance data associated with each of the event occurrence invitee identifiers to a group-based communication server 106. The validated external resource 103 may be operable to send an event occurrence data structure to a group-based communication server 106.

In some embodiments, the validated external resource include a software program, application, platform, or service that is configured to communicate with the group-based communication system and which service, manage, and/or perform actions that form various functions of an app that is accessible to a client device via a group-based communication interface. The validated external resource operates on a compiled code base or repository that is separate and distinct from that which supports the group-based communication system. The validated external resource may comprise additional storage repositories (e.g., databases) associated with tasks, functions, and/or actions that may be performed via the validated external resource. In some embodiments, the validated external resource may communicate with the group-based communication system, and vice versa, through one or more application program interfaces (APIs). In some embodiments, the validated external resource receives tokens or other authentication credentials that are used to facilitate secure communication between the validated external resource and the group-based communication system in view of group-based communication system network security layers or protocols (e.g., network firewall protocols). As various examples, a validated external resource may be configured for executing a calendaring/scheduling app, a to-do list app, a service provider app, a software testing app, a storage repository app, and/or the like.

In some embodiments, an external resource entity identifier includes one or more items of data by which a user of an external resource may be uniquely identified by a group-based communication system. For example, an external resource entity identifier may comprise American Standard Code for Information Interchange (ASCII) text, a pointer, a memory address, and the like. One or more external resource entity identifiers may be stored to a limited profile of a group-based communication system along with other identifiers (e.g., user identifier, group identifiers, group-based communication channel identifiers, etc.). The external resource entity identifier may be embodied in a format native to the external resource to which it is associated or may be structured in a format designated by the group-based communication system. In certain embodiments, the external resource entity identifier further identifies the validated external resource to which the external resource entity identifier applies. Correlating one or more external resource entity identifiers to a user account or user identifier of the group-based communication system allows the group-based communication system to link accounts from disparate external resources with a selected group-based communication system user account.

In some embodiments, event occurrence, event object, or event can include a data object, a data structure, a data set, or collection of data and instructions that collectively represents a work object of an validated external resource (in which case an event occurrence is an external event occurrence embodied as an external work object) or of the group-based communication system (in which case an event occurrence is an internal event occurrence embodied as an internal work object) providing scheduling features. Each event occurrence encompasses contextual data comprising metadata and/or content data associated with the event occurrence. The form and use of the contextual data of the event occurrence may vary between different validated external resources. One example of a standard defining data structure for event occurrence data objects and calendar data exchange is the iCalendar standard, known more formally as the Internet Calendaring and Scheduling Core Object Specification, RFC 2445. In the iCalendar standard, calendar data is stored in the top-level object, known as the Calendaring and Scheduling Core Object.

In some embodiments, work object contextual data can include data that is extracted or derived from a work object that may affect how the work object is determined to relate to other work objects. As discussed herein, work object contextual data comprises metadata, such as title/subject information, date and time information, work object owner/creator information, work object type information (e.g., file, email, call, image, ticket, task, etc.), work object detail information that comprises text, images, audio, and file attachments, objects attached to the event (e.g., audio, file, video, tasks) and/or one or more predefined work object data fields. The work object contextual data may further include a validated external resource identifier, a user identifier, one or more group-based communication channel identifiers associated with group-based communication channels that the user has been granted access to, one or more group identifiers for groups with which the user is associated, message identifier, event identifier, or external work object identifier. The group-based communication system may be configured to further facilitate indexing the work object contextual data.

Data objects may take many forms, including as work objects, as user profile objects, as channel profile objects, and/or the like. As utilized herein, "work objects" are embodied as electronic data objects specifically executable and/or otherwise accessible via the group-based communication system 105 and/or at least one validated external resource 103. Work objects may be received at the group-based communication system 105 by receiving those work objects conveyed to (pushed to) the group-based communication system 105, or the group-based communication system 105 may retrieve (pull to) various work objects stored within accessible storage areas of one or more client devices 101A-101N, validated external resource 103, and/or the like. The work objects may convey human-readable representations of information and/or computer-executable content that causes a particular client device 101A-101N to operate in a particular way. Specifics of certain work objects examples are discussed herein, however it should be understood that in certain embodiments, work objects may be embodied as emails, events, audio files, video files, document files, spreadsheet files, presentation files, tasks, and/or the like; as well as any contextual data corresponding therewith. Work objects may thus be non-personal (alternatively referred to as public) as they are exchanged between a plurality of users or otherwise made available to a plurality of users. Alternatively, work objects may be personal in nature (e.g., as defined by a portion of metadata associated with the work object), such that access to the content of the work object is limited to a single user (or a limited number of defined users). For example, work objects personal to a single user may encompass tasks or task lists defined personally by and for a particular user. Access to personal work objects may be limited to access requests associated with defined user identifiers. In certain embodiments, personal work objects may be represented as encrypted data when indexed in database storage areas and/or when included within work graph data structures including personal and non-personal work objects.

The contextual data comprises an event identifier that uniquely identifies a particular created event occurrence. The contextual data of an event occurrence of certain embodiments is embodied as an event occurrence data structure comprising a plurality of event occurrence parameters, including the event identifier. Each event occurrence parameter may be one of an event occurrence timestamp, an event occurrence location identifier, an event occurrence start time identifier, an event occurrence run time identifier, an event occurrence completion indicator, an event occurrence creator identifier, an event occurrence invite identifier, an event occurrence acceptance identifier, an event occurrence decline identifier, an event occurrence acceptance identifier, and event occurrence title. In embodiments, an event occurrence is an electronic representation of a live in-person event during which one or more attendees gather or collaborate for a particular duration of time. In various embodiments, the live in-person event occurs at one or more physical locations and/or involves audio and/or video connections for said collaboration. As discussed herein, the context data may be supplemented with supplemental metadata, for example, upon generation of a recording for a particular event.

In some embodiments, event identifier includes one or more items of data by which an event occurrence may be uniquely identified. For example, an event identifier may comprise ASCII text, a pointer, a memory address, and/or the like.

In some embodiments, an event occurrence data structure or event data structure refers to a collection of data associated with an event occurrence capable of being transmitted, received, and/or stored. In various embodiments, the event occurrence data structure may comprise a plurality of event occurrence parameters. In various embodiments, the event occurrence data structure may be associated with one or more group-based communication channel identifiers. An event occurrence parameter or event parameter refers to a collection of data that defines one or more aspects of an event occurrence. In various embodiments, an event occurrence parameter may be one of an event identifier, an event occurrence timestamp, an event occurrence location identifier, an event occurrence start time identifier, an event occurrence run time identifier, an event occurrence completion indicator, an event occurrence invitee identifier, an event occurrence invitation acceptance identifier, an event occurrence invitation decline identifier, or event occurrence attendee/participant identifier, an event occurrence title, an event occurrence attachment, and/or the like.

In some embodiments of an exemplary group-based communication system, a message or communication message may be sent from a client device 101A-101N to a group-based communication server 106. In various implementations, the message may be transmitted to the group-based communication system 105 over communications network 108 directly by a client device 101A-101N, the message may be transmitted to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide a message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version= "1.0" encoding = "UTF-8"?>
<auth_request>
    <timestamp>2020-12-31 23:59:59</timestamp>
    <user_accounts_details>
     <user_account_credentials>
        <user_name>ID_user_1 </user_name>
        <password>abc123</password>
        //OPTIONAL <cookie>cookieID</cookie>
        //OPTIONAL <digital_cert_link>www.mydigitalcertificate.com/
JohnDoeDaDoeDoe@gmail.com/mycertifcate.dc</digital_cert_link>
        //OPTIONAL <digital_certificate>_DATA_</digital_certificate>
     </user_account_credentials>
    </user_accounts_details>
    <client_details> //iOS Client with App and Webkit
        //it should be noted that although several client details
        //sections are provided to show example variants of client
        //sources, further messages will include only on to save
        //space
     <client_IP>10.0.0.123</client_IP>
     <user_agent_string>Mozilla/5.0 (iPhone; CPU iPhone OS 7_1_1 like Mac OS X)
AppleWebKit/537.51.2 (KHTML, like Gecko) Version/7.0 Mobile/l1D201
Safari/9537.53</user_agent_string>
      <client_product_type>iPhone6,1</client_product_type>
      <client_serial_number>DNXXX1X1XXXX</client_serial_number>
      <client_UDID>3XXXXXXXXXXXXXXXXXXXXXXXXD</client_UDID>
      <client_OS>iOS</client_OS>
      <client_OS version>7.1.1 </client_OS_version>
      <client_app_type>app with webkit</client_app_type>
      <app_installed_flag>true</app_installed_flag>
      <app_name>MSM.app</app_name>
      <app_version>1.0 </app_version>
      <app_webkit_name>Mobile Safari</client_webkit_name>
      <client_version>537.51.2</client_version>
    </client_details>
    <client_details> //iOS Client with Webbrowser
      <client_IP>10.0.0.123</client_IP>
      <user_agent_string>Mozilla/5.0 (iPhone; CPU iPhone OS 7_1_1 like Mac OS X)
AppleWebKit/537.51.2 (KHTML, like Gecko) Version/7.0 Mobile/l1D201
Safari/9537.53</user_agent_string>
      <client_product_type>iPhone6, 1</client_product_type>
      <client_serial_number>DNXXX1X1XXXX</client_serial_number>
      <client_UDID>3XXXXXXXXXXXXXXXXXXXXXXXXD</client_UDID>
      <client OS>iOS</client_OS>_
      <client_OS_version>7.1.1 </client_OS_version>
      <client_app_type>web browser</client_app_type>
      <client_name>Mobile Safari</client_name>
      <client_version>9537.53</client_version>
    </client_details>
    <client_details>//Android Client with Webbrowser
      <client_IP>10.0.0.123</client_IP>
      <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
      <client_product_type>Nexus S</client_product_type>
      <client_serial_number>YXXXXXXXXZ</client_serial_number>
      <client_UDID>FXXXXXXXXX-XXXX-XXXX-XXXX-
XXXXXXXXXXXX </client_UDID>
      <client_OS>Android</client_OS>
      <client_OS_version>4.0.4</client_OS_version>
      <client_app_type>web browser</client_app_type>
      <client_name>Mobile Safari</client_name>
      <client_version>534.30</client_version>
    </client_details>
    <client_details> //Mac Desktop with Webbrowser
      <client_IP>10.0.0.123</client_IP>
      <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
      <client_product_type>MacPro5,1</client_product_type>
      <client_serial_number>YXXXXXXXXZ</client_serial_number>
      <client_UDID>FXXXXXXXXX-XXXX-XXXX-XXXX-
```

```
    XXXXXXXXXXXXX </client_UDID>
      <client_OS>Mac OS X</client_OS>
      <client_OS_version>10.9.3</client_OS_version>
      <client_app_type>web browser</client_app_type>
      <client_name>Mobile Safari</client_name>
      <client_version>537.75.14</client_version>
    </client_details>
    <message>
      <message_identifier>ID_message_10</message_identifier>
      <team_identifier>ID_team_1</team_identifier>
      <channel_identifier>ID_channel_1</channel_identifier>
      <contents>That is an interesting invention. I have attached a copy our patent
    policy.</contents>
      <attachments>patent_policy.pdf</attachments>
    </message>
</auth_request>
```

The group-based communication system 105 comprises at least one group-based communication server 106 that may create a storage message based upon the received message to facilitate message indexing and storage in a communication message database. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

nication channel identifier or channel identifier can include one or more items of data by which a group-based communication channel may be uniquely identified. For example, a group-based communication channel identifier may comprise ASCII text, a pointer, a memory address, and the like.

In embodiments, decisions identifiers may be associated with the message. In one implementation, the message contents may be parsed (e.g., using PHP commands) to identify decision identifiers in the message. For example, hashtags in the message may be decision identifiers associated with the message. In another example, the message may be analyzed (e.g., by itself, with other messages in a conversation primitive) or parsed using a machine learning

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topi c>
    </topics>
    <responses>
        <response>liked by ID_user_2</response>
        <response>starred by ID_user_3</response>
    </responses>
    <contents>That is an interesting invention. I have attached a copy our patent
policy.</contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In embodiments, a group identifier as defined above may be associated with the message. In some embodiments, a group identifier or team identifier include one or more items of data by which a group within a group-based communication system may be uniquely identified. For example, a group identifier may comprise ASCII text, a pointer, a memory address, and the like.

In embodiments, a group-based communication channel identifier as defined above may be associated with the message. In some embodiments, the group-based commutechnique, such as topic modeling, to identify decision identifiers associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message. In some embodiments, the sending user identifier is associated with a collection of messages that are transmitted by a particular user (i.e., a client device associated with the particular user) intended for posting within a group-based communication system (defined below). These messages may be analyzed to determine context regarding the user (e.g., the user's expertise or interest in a topic may be determined based on the frequency of mention of the topic or key words associated with the topic within such messages). The sending user identifier may be the user (i.e., client device associated with the user) who approved or created the group-based communication decision record.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. Said reaction data may be used to determine or set a user interaction indicator. A user interaction indicator comprises signals of engagement and/or likelihood of engagement by a user with a group-based communication interface including, without limitation, message communications and message communication information, user profile associated information, members of the same or different communication channels, direct messages and direct message information, client device reported location data, mouse-over data, click data, channel engagement data, and the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, a direct message includes a collection of communication messages between two users of the group-based communication system. A direct message may also be referred to as a group-based communication channel with two users as members of the group-based communication channel.

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from the decision record database 210). In one implementation, a storage message may be transmitted from the server to facilitate indexing in the decision record database 210. In another implementation, metadata associated with the message may be determined and the message may be indexed in the decision record database 210. In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the decision record database 210 to facilitate searching. In one embodiment, the files may be indexed such that a company's or a group's files are indexed at a separate distributed database.

Figure 2:
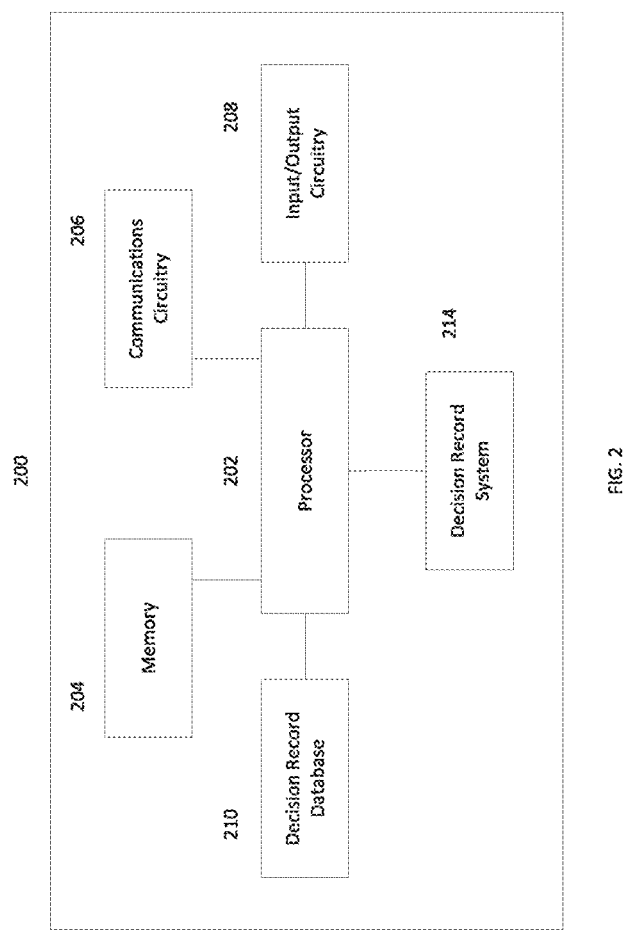
FIG. 2 illustrates a schematic block diagram of circuitry that can be included in a computing device in accordance with some embodiments discussed herein.

FIG. 2 shows a schematic block diagram of circuitry 200, some or all of which may be included in, for example, group-based communication repository 107, group-based communication server 106, and/or client devices 101A-

101N. Any of the aforementioned systems or devices may include the circuitry 200 and may be configured to, either independently or jointly with other devices in a communication network 108 perform the functions of the circuitry 200 described herein. As illustrated in FIG. 2, in accordance with some example embodiments, circuitry 200 can include various means, such as processor 202, memory 204, communications circuitry 206, and/or input/output circuitry 208. In some embodiments, decision record database 210 and/or a decision record system 214 may also or instead be included. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

In some embodiments, a circuitry includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 202 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 202 is configured to execute instructions stored in memory 204 or otherwise accessible to processor 202. These instructions, when executed by processor 202, may cause circuitry 200 to perform one or more of the functionalities of circuitry 200 as described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. Alternatively, as another example, when processor 202 is embodied as an executor of instructions, such as may be stored in memory 204, the instructions may specifically configure processor 202 to perform one or more algorithms and operations described herein, such as those discussed in connection with FIGS. 1-14.

Communications circuitry 206 may be embodied as any device or means embodied in hardware, a computer program product comprising computer readable program instructions stored on a computer readable medium (e.g., memory 204) and executed by a processing device (e.g., processor 202), or a combination thereof that is configured to receive and/or transmit data from/to another device and/or network, such as, for example, a second circuitry 200 and/or the like. In some embodiments, communications circuitry 206 (like other components discussed herein) can be at least partially embodied as or otherwise controlled by processor 202. In this regard, communications circuitry 206 may be in communication with processor 202, such as via a bus. Communications circuitry 206 may include, for example, an antenna, a transmitter, a receiver, a transceiver, network interface card and/or supporting hardware and/or firmware/software for enabling communications with another computing device. Communications circuitry 206 may be configured to receive and/or transmit any data that may be stored by memory 204 using any protocol that may be used for communications between computing devices. Communications circuitry 206 may additionally or alternatively be in communication with the memory 204, input/output circuitry 208 and/or any other component of circuitry 200, such as via a bus.

Input/output circuitry 208 may be in communication with processor 202 to receive an indication of a user input and/or to provide an audible, visual, mechanical, or other output to a user (e.g., provider and/or consumer). Some example visual outputs that may be provided to a user by circuitry 200 are discussed in connection with FIGS. 4-8 and 14. As such, input/output circuitry 208 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output circuitry 208 may be reduced as compared to embodiments where circuitry 200 is implemented as an end-user machine (e.g., consumer device and/or provider device) or other type of device designed for complex user interactions. In some embodiments (like other components discussed herein), input/output circuitry 208 may even be eliminated from circuitry 200. Alternatively, such as in embodiments wherein circuitry 200 is embodied as a server or database, at least some aspects of input/output circuitry 208 may be embodied on an apparatus used by a user that is in communication with circuitry 200. Input/output circuitry 208 may be in communication with the memory 204, communications circuitry 206, and/or any other component(s), such as via a bus. One or more than one input/output circuitry 208 and/or other component can be included in circuitry 200.

Decision record database 210 and decision record system 214 may also or instead be included and configured to perform the functionality discussed herein related to generating and/or editing a group-based communication decision record; generating, editing, and displaying a group-based communication summary interface; and generating and/or performing instructions defined in decision data structures, such as creating work objects. In some embodiments, some or all of the functionality of generating and/or editing a group-based communication decision record; generating, editing, and displaying a group-based communication summary interface; and generating and/or performing instructions defined in decision data structures may be performed by processor 202. In this regard, the example processes and algorithms discussed herein can be performed by processor 202, decision record database 210, and/or decision record system 214. For example, non-transitory computer readable media can be configured to store firmware, one or more application programs, and/or other software, which include instructions and other computer-readable program code portions that can be executed to control each processor (e.g., processor 202, decision record database 210, and/or decision record system 214) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

Figure 3A:
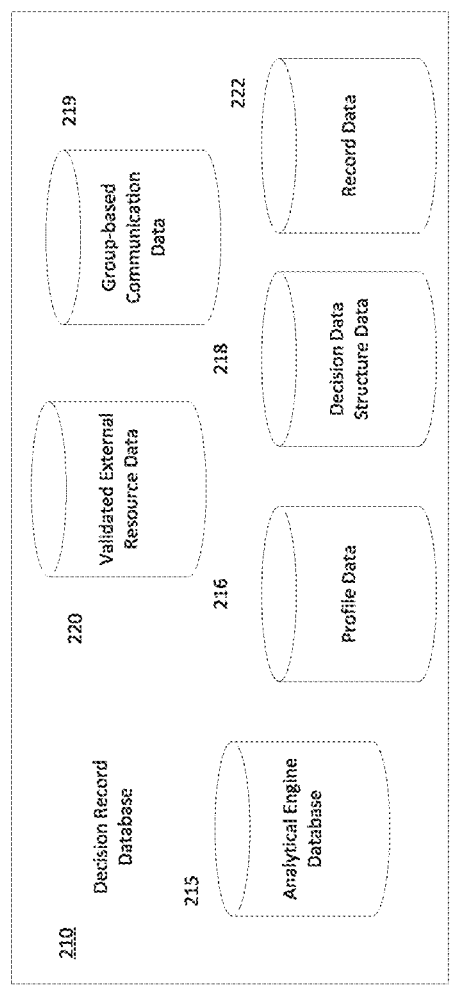
FIG. 3A illustrates an example decision record database in accordance with some embodiments discussed herein.

In some embodiments, such as illustrated in FIG. 3A, a decision record database 210 may be provided that includes profile data 216, decision data structure data 218, group-based communication data 219, record data 222, and validated external resource data 220.

In some embodiments, a group-based communication decision record includes an electronically generated digital content object, generated by the group-based communication system or provided by a user using a client device, that is associated with a plurality of group-based communication messages and provides a record of a decision. Group-based communication decision records may include any text, image, video, audio, or combination thereof generated by the group-based communication system or provided by a user (using a client device) that may then be stored in the group-based communication system. Each group-based communication decision record includes metadata comprising one or more of the following: a sending user identifier, a message identifier, decision record contents, a group identifier, and a group-based communication channel identifier. Each of the foregoing identifiers may comprise ASCII text, a pointer, a memory address, and the like.

The group-based communication decision record may be associated with a group-based communication summary interface which is renderable for display on the group-based communication interface. The group-based communication summary interface provides a visual display indicating that a decision has been made. The group-based communication summary interface may include any text, image, video, audio, or combination thereof generated by the group-based communication system or provided by a user (using a client device) that may then be rendered on the group-based communication interface. Each group-based communication decision summary interface includes metadata comprising one or more of the following: a sending user identifier, a message identifier, decision record contents, a group identifier, and a group-based communication channel identifier. Each of the foregoing identifiers may comprise ASCII text, a pointer, a memory address, and the like.

Group-based communication data 219 may include group-based communication channels data, thread data, graphical identifiers data, channeling association data, files created or stored in the group-based communication system 105 (e.g., documents, videos, etc.), user identifiers data, and any other similar information. For instance, data relating to group-based communication channels may be stored in the decision record database 210 as group-based communication data 219. The decision record database 210 may include profile data 216 that includes the biographical data and/or preference data associated with a specific user profile or group profiles. Decision data structure data 218 may include a variety of data related to decision identifiers and decision data structures. For instance, the decision data structure data 218 may include decision data structures including the various decision identifiers described herein, and any other data associated with the decision data structure. For instance, the decision data structure data 218 may be used to determine one or more instructions that may be used to generate work objects and complete decision workflows. In some embodiments, the decision data structure can include a collection of data and instructions associated with a decision identifier capable of being transmitted, received, and/or stored. In various embodiments, the decision data structure may be associated with a plurality of decision identifiers. In various embodiments, the decision data structure may be associated with one or more group-based communication channel identifiers. In some embodiments, participants in a group-based communication channel may decide that a form needs to be filled out. The group-based communication system may identify a decision identifier and thus a decision data structure with data and instructions for populating the form. In some embodiments, participants in a group-based communication channel may decide that an email should be sent to a user. The group-based communication system may identify a decision identifier and thus a decision data structure with data and instructions for populating the email. Various decision data structures may be determined from an analysis of the communication messages.

In some embodiments, the decision workflow includes a collection of data organized in a particular pattern where each data entry in the particular pattern is associated with a decision. As decision records are stored, the decision records may be associated with decision data structures and decision workflows such that storage of the decision record and/or transmission or creation of a work object may be associated with a particular data entry. Once that decision record is stored and/or the work object is transmitted/created, the particular data entry may be referred to as completed. As each data entry in the decision workflow is completed, the decision workflow moves towards completion.

Validated external resource data 220 may be any information hosted by a validated external resource 103 that may be accessed by the group-based communication system 105. The group-based communication system 105 may store copies of the validated external resource data in the decision record database 210. The validated external resource data 220 may be used to generate work objects. Record data 222 may include any information associated with decision records. For instance, record data 222 may include information associated with decision identifiers and decision records generated and transmitted in response to the identification of the decision identifiers and group-based communication summary interfaces generated and displayed in response to the decision records. Additionally or alternatively, the decision record database 210 may include analytical engine database 215 which may provide any additional information needed by the decision record system 214 in analyzing group-based communication messages and generating and/or editing group-based communication decision records; generating, editing, and displaying group-based communication summary interfaces; and generating and/or performing instructions comprised in decision data structures.

In some examples, the decision record system 214 may be configured to input decision record database 210 data. The decision record database 210 may include properties of the decision identifiers and work objects and the like, relationships that may hold between the decision identifiers, decision records, decision data structures, work objects, and the like, and representations of any specific knowledge that is required. The decision record database 210 may contain information related to a particular domain, industry, and/or group-based communication channel. Example domains may include, but are not limited to, information technology, human resources, marketing, business, medical, industrial, entertainment, news, legal, financial and/or the like. In some examples, the decision record system 214 may classify participants as representative of a category related to the particular domain. The decision record database 210 may be used to weigh group-based communication messages generated by certain participants which helps identifying decision identifiers and decision data structures.

Figure 3B:
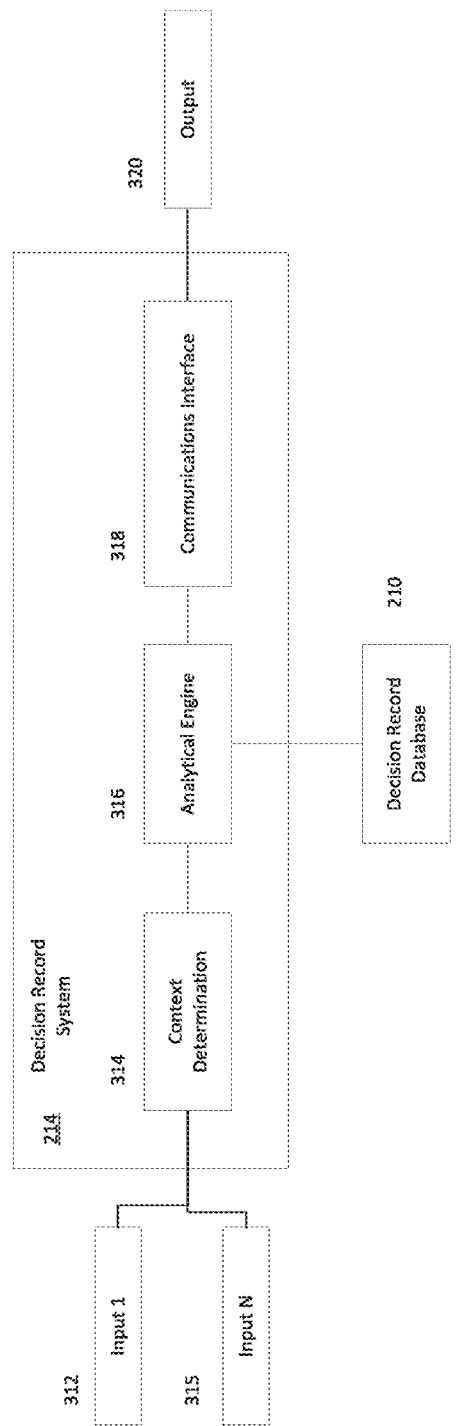
FIG. 3B illustrates an example decision record system in accordance with some embodiments discussed herein.

In some embodiments, with reference to FIG. 3B, the decision record system 214 may include a context determination module 314, analytical engine 316, and communications interface 318, all of which may be in communication with the decision record database 210. The decision record system 214 may receive one or more requests, work objects, messages, identifiers, responses, etc. as input 312-315, and may generate decision record requests, group-based communication decision records, group-based communication summary interfaces, and/or decision data structures and work objects in response. In some embodiments, the input 312-315 may include a direct request from the user to generate a group-based communication decision record, while in some embodiments the input 312-315 may include a request from the system to generate a group-based communication decision record.

The input 312-315 may comprise a keyword or text-based search input with other modes of search input. For example, input 312-315 can include image input or media input (e.g., video, audio, graphic, image, etc.) to which the decision record system 214 can allow for performance of searches based on text-based, image, and/or media search modes of input into a query. Additionally, when the user or decision record system 214 initiates a search, other parameters may be used to refine the search results which will be described further below.

The decision record system 214 can be configured to access said data as well as data corresponding to one or more group-based communication channels, graphical identifiers, user profiles, group profiles, decision record database data, files, threads, etc. associated with the user identifier (e.g., a client device associated with the group-based communication feed), and generate decision record requests, group-based communication decision records, group-based communication summary interfaces, and/or decision data structures and work objects. The decision record system 214 may use any of the algorithms or processes disclosed herein for receiving/capturing data and generating decision record requests, group-based communication decision records, group-based communication summary interfaces, and/or decision data structures and work objects in response. In some other embodiments, such as when the circuitry 200 is embodied in a group-based communication repository 107, group-based communication server 106 and/or client devices 101A-101N, the decision record system 214 may be located in another circuitry 200 or another device, such as another group-based communication server 106, group-based communication repository 107, and/or client devices 101A-101N.

With reference to FIG. 3B, whether used locally or over a network, the decision record system 214 may be used to generate one or more decision record requests, group-based communication decision records, group-based communication summary interfaces, and/or decision data structures and work objects. The decision record system 214 may receive a plurality of input 312-315 from the circuitry 200 and process the inputs 312-315 within the decision record system 214 to produce an output 320, which may include one or more generate decision record requests, group-based communication decision records, group-based communication summary interfaces, and/or decision data structures and work objects. In some embodiments, the decision record system 214 may execute context determination using the context determination module 314, process the data in an analytical engine 316, and communications interface 318 to generate decision record requests, group-based communication decision records, group-based communication summary interfaces, and/or decision data structures and work objects and output the results via a group-based communication interface. Each of these steps may pull data from a plurality of sources including the decision record database 210, which may be located in the group-based communication server 106, group-based communication repository 107, and/or client devices 101A-101N.

When input 312-315 is received by the decision record system 214, context determination using the context determination module 314 may first be made. A context determination includes such information as a user or group preference data, when and what user initiated receipt of the input (e.g., when and who selected the actuator that initiated the request, when and who created the message), what type of input was provided (e.g., was a decision record request initiated, was a decision identifier identified, were a plurality of messages received) and under what circumstances was receipt of the input initiated (e.g., has a decision record associated with the plurality of group-based communication messages been transmitted previously, etc.). This information may give context to the decision record system 214 analysis to determine the output. For example, the context determination module 314 may inform the decision record system 214 as to when and what decision record request, group-based communication decision record, group-based communication summary interface, and/or decision data structure and work object to output.

In some embodiments, the input 312-315 is a plurality of group-based communication messages. The analytical engine 316 may parse the plurality of group-based communication messages to identify one or more decision identifiers. The analytical engine 316 may communicate with the decision record database 210 to identify one or more decision identifiers. In some embodiments, the analytical engine 316 may identify one or more timestamps associated with the plurality of group-based communication messages to help identify the appropriate decision identifiers. Once one or more decision identifiers are identified, the analytical engine 316 may communicate with the decision record database 210 to generate or identify a decision record request and/or decision data structure based on the one or more decision identifiers. The decision record system 214 may then output 320 the appropriate decision record request and/or instructions for creating the appropriate work object based on the appropriate decision data structure.

In some embodiments, the analytical engine 316 may receive a group-based communication decision record response as input 312-315. The analytical engine 316 may analyze the group-based communication decision record response, which may include an approval or disapproval of a decision record and/or a draft group-based communication decision record. The analytical engine 316 may then communicate with the decision record database 210 to generate a draft group-based communication decision record (if not received as input 312-315) and transmit as output 320 the draft group-based communication decision record for approval. The analytical engine 316 may receive another group-based communication decision record response as input 312-315 and then output 320 the group-based communication decision record for storing and/or a group-based communication summary interface for display. If the group-based communication decision record response included a draft group-based communication decision record, then the analytical engine 316 may output 320 the associated group-based communication decision record and/or group-based communication summary interface.

In some embodiments, the analytical engine 316 may output 320 a plurality of group-based communication decision records, e.g., in response to input 312-315 including a summary request. The plurality of group-based communication decision records may be stored in one or more memories. In some embodiments, the analytical engine 316 may output 320 a plurality of group-based communication summary interfaces, e.g., in response to input 312-315 including a summary request. The plurality of group-based communication summary interfaces may be displayed in one or more display panes. In some embodiments, the analytical engine 316 may output 320 a decision data structure that includes instructions for generating one or more work objects. Those instructions may be performed by the analytical engine 316 resulting in a work object being outputted 320. In some embodiments, the instructions may be performed by a validated external resource 103.

In some embodiments, the analytical engine 316 may parse the group-based communication messages to determine one or more topics (e.g., conversation topics or content topics) that are then used to form queries for use in identifying decision identifiers. The decision record system 214 may draw information from the decision record database 210 to determine one or more topics. The decision record system 214 may use multiple techniques to identify decision identifiers and can include, but are not limited to: extracting keywords, using machine learning, to match the text query, extracting keywords derived from the group-based communication information, parsing the attached media for embedded metadata, extracting annotations or commentary associated with the group-based communication messages, and combinations thereof.

In some embodiments, a conversation topic includes a theme or point of discussion upon which a group-based communication conversation may be focused. The conversation topic is programmatically determined based upon parsing of text strings contained within one or more group-based communication conversation messages associated with a particular group-based communication conversation. In various embodiments, group-based communication conversation segments may each be associated with a conversation topic. In various embodiments, a conversation topic may be analyzed to identify a decision identifier and generate a group-based communication decision record. In some embodiments, the conversation topic may be used to indicate a new decision record is needed.

In some embodiments, a content topic includes a theme or point of discussion upon which content may be focused. The content topic is programmatically determined based upon parsing of text strings contained within one of a file, an event, or any other data or collection of data capable of being transmitted, received, and/or stored. For example, the message may be parsed using a machine learning technique, such as topic modeling (e.g., Latent Dirichlet allocation topic modeling), to determine topics associated with the message. In various embodiments, content creation occurrences may each be associated with a content topic. In various embodiments, a content topic may be used to identify a decision identifier and generate a group-based communication decision record.

In some embodiments, the decision record system 214 may query validated external resources for data objects. The decision record system 214 may query validated external resources based on the topics to locate data objects and copy located data objects for use by the analytical engine 316 in creating group-based communication decision records and/or work objects. The query may include different data than would be in a query directed to the decision record database 210, and may be particular to the validated external resource. In some embodiments, emails may have been previously forwarded to the group-based communication system 105 and stored on the group-based communication system 105. In such cases, the decision record system 214 may query the decision record database 210 and obtain such emails. In some embodiments, the decision record system 214 may analyze emails as the emails are received by the group-based communication system 105 as disclosed herein and categorize or store the emails based on the analysis of the emails. When the emails have not been previously forwarded to the group-based communication system 105, the group-based communication system may cause a search request to be transmitted to the validated external resource, which would then need to accept the request for the group-based communication system 105 to obtain the data objects from the validated external resource. The emails may be used to detect decision identifiers.

In some embodiments, the analytical engine 316 may determine that a group-based communication decision record and/or work object has already been presented. In such cases, the decision record system 214 may output 320 another generated copy of the group-based communication decision record and/or work object or may output 320 a reference/pointer to the already generated group-based communication decision record and/or work object. The analytical engine 316 may determine that a group-based communication decision record and/or work object has already been presented by identifying the topics associated with the group-based communication messages. The analytical engine 316 is further configured to ensure that the group-based communication decision record and/or work object is fresh and up to date. For example, the analytical engine 316 may modify or delete a group-based communication decision record and/or work object.

In one embodiment, the analytical engine 316 may determine semantic importance of one or more keywords or text phrases found in each group-based communication message. The analytical engine 316 may select keywords or phrases that appear most often in the last group-based communication message (i.e., the group-based communication message with the latest timestamp) of a conversation segment as the most semantically important keywords or phrases. Other text analytic techniques may be applied to rank keywords and/or text phrases and determine most important text phrases. In another example embodiment, the important keywords or phrases may be identified based on keywords or phrases already associated with a decision record or decision data structure according to decision record database 210. In yet another example embodiment, important keywords or phrases may be identified based on other decision records considered peripheral to the select group-based communication messages, but not directly associated with the select group-based communication messages. Once the important keywords and/or text phrases are identified, decision record requests and/or decision data structures matching the important keywords and/or text phrases may be retrieved and/or generated using the decision record database 210. As such, decision record requests and/or decision data structures may be associated with a variety of users and channels and not necessarily a channel where the user is a member.

In some embodiments, a group-based communication conversation segment includes a set of communication messages grouped by a server in a group-based communication system where all communication messages within the conversation segment are determined to have at least one identical conversation primitive identifier. In some embodiments, communication messages in one conversation segment are directed to the same topic. In some embodiments, the set of communication messages in one conversation segment has message send order proximity, message send time proximity, and sending user identifier proximity that exceeds a respective defined threshold. In some embodiments, one conversation segment may be determined to be related to another conversation segment and one conversation segment may include several conversation segments. In some embodiments, a conversation segment may be grouped by a server by using a conversation segmenting learning model, which may be derived using one or more group-based communication message corpuses.

Examples of content ranking for use with embodiments of the present disclosure are disclosed in U.S. patent application Ser. No. 15/853,376 titled "SYSTEM, APPARATUS, AND COMPUTER PROGRAM PRODUCT FOR GENERATING A GROUP-BASED COMMUNICATION INTERFACE HAVING IMPROVED PANES POSITIONED IN A DEFINED DISPLAY WINDOW," filed Dec. 22, 2017, the contents of which are incorporated herein by reference in their entirety.

Once the set of keywords or phrases are identified, the analytical engine 316 can further filter the set to identify or highlight keywords or phrases that may be considered to be particularly relevant or indicative of a decision having been made. In one embodiment, relevancy may be based on one or more user's own actions. As described above, users may respond to group-based communication messages made by other users via reactions (e.g., selection of an emoji associated with the message, selection of a "like" button associated with the message), click on a hyperlink embedded a the message, reply to a message with certain text, download a file, share a message from one group-based communication channel to another group-based communication channel, pin a message, star a message, follow a channel, unfollow a channel, create a thread, create a channel, follow a user identifier, unfollow a user identifier, attend an event occurrence, not attend an event occurrence, and/or the like, which may all indicate that the action indicates a decision has been made. In one implementation, relevant keywords or phrases are based on if other users who are similar to the user tend to use the keywords or phrases. In yet another example implementation, relevant keywords or phrases may be implicitly identified by analyzing user behaviors implying that the user tends to use certain keywords or phrases when making a decision. For instance, the user may use the same phrase or reaction to indicate that a decision has been made.

The analytical engine 316 may further provide additional filtering parameters associated with the selected keywords or phrases. Additional filtering may be applied after or concurrently with the keywords or phrases retrieval and decision identifiers identification. For instance, filtering may be based on a user's preference to only receive decision records based on decision identifiers associated with certain users or during certain periods of time.

The analytical engine 316 may be configured to provide additional filtering parameters preferably comprising developing a relevance score assigned to each keywords or phrases, and then selecting the keywords or phrases according to relevance scores. Selection of keywords or phrases as decision identifiers may be based on the score of a keyword or phrase satisfying a certain threshold, having the highest scores up to a certain number, matching a certain criteria, by removing results that match another criteria, or by any suitable selection technique.

The relevance score may also consider the timestamp associated with the keywords or phrases in comparison to the network time associated with other keywords or phrases. Newer keywords or phrases may be scored as more relevant than older keywords or phrases, or keywords or phrases within a defined time period may be scored as more relevant than keywords or phrases associated with timestamps outside of that period of time. The user may adjust the period of time. For instance, keywords or phrases created months prior to other keywords or phrases may have a lower score. The analytical engine 316 may also consider the proportion of the keywords or phrases related to the topic when determining the relevance score. For instance, keywords or phrases with a high number of topic "hits" within the keywords or phrases may be scored higher than keywords or phrases with a single mention of the topic. The analytical engine 316 may also consider the users associated with the keywords or phrases when determining the relevance score. For instance, keywords or phrases shared among users may be scored higher than keywords or phrases used by a single user.

The analytical engine 316 may be configured to access decision record database 210 to determine one or more user interest indicators from profile data. Such user interest indicators may be a user status indicator, a user job indicator, a user interaction indicator, and the like. The analytical engine 316 may score keywords or phrases higher when their topics (e.g., key terms, metadata, file contents, etc.) correspond to a user's status or job within an organization. For example, a user may be an engineer for a project. In such embodiment, the analytical engine 316 may score keywords or phrases associated with a supervisor of the project higher than keywords or phrases associated with an engineer not associated with the project.

In some embodiments, the decision record system 214 may make use of one or more machine learning algorithms or statistical models to improve the scoring calculation.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example interfaces discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202, decision record database 210, and/or decision record system 214 discussed above, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Dynamic UI

Figure 9:
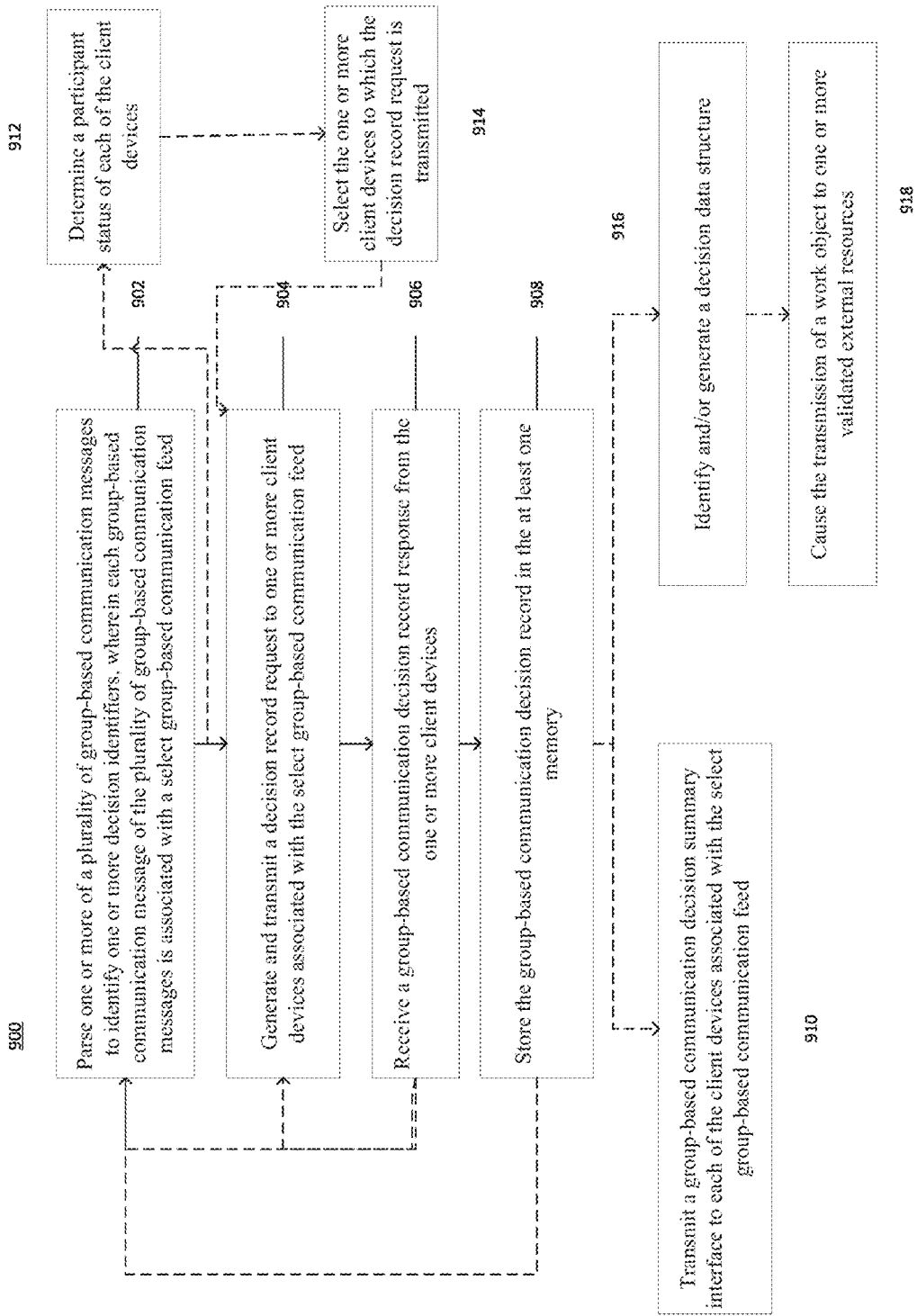
FIG. 9 illustrates a flow diagram of an example group-based communication system in accordance with some embodiments discussed herein.

FIG. 9 illustrates a flow diagram of an example system in accordance with some embodiments discussed herein. In particular, FIG. 9 illustrates method 900 which includes parsing one or more of a plurality of group-based communication messages to identify one or more decision identifiers, wherein each group-based communication message of the plurality of group-based communication messages is associated with a select group-based communication feed 902; generating and transmitting a decision record request to one or more client devices associated with the select group-based communication feed 904; receiving a group-based communication decision record response from the one or more client devices 906; storing the group-based communication decision record in the at least one memory 908; and transmitting a group-based communication decision summary interface to each of the client devices associated with the select group-based communication feed 910. As shown in FIG. 9, the method 900 may also include determining a participant status of each of the client devices 912 and selecting the one or more client devices to which the decision record request is transmitted.

In some embodiments, the participant status includes a ranking of client devices associated with a group-based communication interface. For instance, a group of client devices may be associated with a group-based communication channel. Each of the client devices may be associated with a participant status indicating the hierarchy of client devices associated with the group-based communication channel. The participant status may be determined based on one or more items of data that indicate user-associated trends, user behavior, or user reactions; user profile associated information; direct messages and direct message information; client device reported location data; mouse-over data; click data; channel engagement data; a user's role or status within an organization; a user's preferred contacts indicator that indicates preferred users (i.e., wife, kids, parents related to the user or other individuals that the user has indicated as preferred); or aggregated data of other users, perhaps deemed similar to a user of interest (e.g., similar role within a group or enterprise, similar age, gender, etc.), stored to the group-based communication system.

The group-based communication interface is configured to allow users of the interface to communicate within group-based communication channels and across group-based communication channels to provide relevant information to other users efficiently and effectively. The group-based communication interface is configured to allow a user to move between group-based communication channels. For instance, a user can search for specific group-based communication channels, highlight specific group-based communication channels to receive notifications or updates regarding communication messages within the group-based communication channel, create specific group-based communication channels, and view group-based communication summary interfaces to receive relevant information quickly and easily. A summary interface can be presented or directly accessed by a user at a desired time without first having to individually access the applicable group-based communication channel, files, threads, emails, etc. The group-based communication system 105 monitors the group-based communication messages to identify decision identifiers and then generates and transmits group-based communication decision records and group-based communication summary interfaces for review by applicable client devices.

As indicated at block 902 of FIG. 9, the decision record system 214 may parse one or more of a plurality of group-based communication messages to identify one or more decision identifiers, wherein each group-based communication message of the plurality of group-based communication messages is associated with a select group-based communication feed. A group-based communication message, as described above, may include a variety of information, such as the data described herein and may be transmitted to the group-based communications system by a particular user (i.e., a client device associated with the particular user) intended for posting within a group-based communication interface. The plurality of group-based communication messages may be analyzed to identify one or more decision identifiers.

In some embodiments, the decision record system 214 may be configured to segment the plurality of group-based communication messages, files (e.g., documents, images, videos, etc.), text, or any other suitable form of information found in the plurality of group-based communication messages into keywords/topics. As part of the segmenting process, the decision record system 214 may normalize the data, performing operations such as stemming or removing words that do not provide information (e.g., "the," "a," or the like). The decision record system 214 may identify one or more decision identifiers.

In block 904, the decision record system 214 may generate and transmit a decision record request to one or more client devices associated with the select group-based communication feed. The decision record request may be based on the one or more decision identifiers and may be transmitted to a select client device or multiple client devices.

As shown in block 906, the decision record system 214 may receive a group-based communication decision record response from the one or more client devices. In some embodiments, the group-based communication decision record response comprises an approval of a group-based communication decision record. One or more client devices may approve the group-based communication decision record. The group-based communication decision record may be a draft group-based communication decision record or may be generated by one or more client devices. In some embodiments, the decision record system 214 may receive a disapproval of a group-based communication decision record in the group-based communication decision record response and then continue to receive group-based communication messages and parse such messages. In some embodiments, the decision record system 214 may receive a disapproval of a group-based communication summary and generate and transmit a revised decision record request after parsing the one or more of the plurality of group-based communication messages again.

At block 908, the decision record system 214 may store the group-based communication decision record in the at least one memory. The decision record system 214 may store the group-based communication decision record in the decision data base 210. In some embodiments, the method 900 may continue back to receiving a plurality of group-based communication messages and parsing one or more of a plurality of group-based communication messages to identify one or more decision identifiers 902.

At block 910, the decision record system 214 may transmit a group-based communication summary interface to client devices associated with the select group-based communication feed 910 for display.

As shown in FIG. 9, in some embodiments, the method 900 may also include determining a participant status of each of the client devices 912 and selecting the one or more client devices to which the decision record request is transmitted 914.

As shown in FIG. 9, in some embodiments, the method 900 may also include identifying and/or generating a decision data structure 916. The method 900 may also include causing the transmission of a work object to one or more validated external resources 918. The work object may be associated with a decision workflow and thus the transmission of the work object may progress the decision workflow to completion.

In some embodiments, work objects include external work objects and/or internal work objects. External work object or remote work object can refer to a data structure or a dataset that is received from a validated external resource (defined below) to a group-based communication system for representing files, calls, tasks, events, notifications, calendar events, emails, contacts, directories (or directory entries), and/or the like that a validated external resource transmits, posts, or shares for rendering to a group-based communication interface. An external work object is associated with a user of a client device (either communicating directly with a group-based communication system or communicating within and/or through a validated external resource).

In some embodiments, internal work object or group-based communication work object refer to a data structure or a dataset created by the group-based communication system and reflects data about files, calls, tasks, events, messages, notifications, calendar events, contacts, directories (or directory entries), and/or emails posted by a group-based communication channel member to a group-based communication interface. An internal work object comprises a file object, a call object, a task object, an event object, a message object, a notification object, an internal calendar event, an internal contact object, an internal directory object, an internal directory entry object, and/or the like. The internal work object is associated with one or more of a group-based communication channel member, a group-based communication message, a group-based communication channel, and another external or internal work object.

In example embodiments, the decision record system 214 may include a variety of modules to analyze the group-based communication messages. In one implementation, such modules may include a work graph generating process (e.g., to generate work graphs (e.g., machine learning structured input data such as a participant status)), a machine learning process (e.g., to generate other machine learning structure input data (e.g., team-level term priority), to generate machine learning structures (e.g., team-level neural networks)), and/or the like. For example, the decision record system 214 may utilize tools such as Apache Hive®, Presto®, Apache Spark®, Apache Solr® node, and/or the like to facilitate analyzing unstructured or structured data from the message communications.

Considering the above information, relationships between user to user, user to channel, user to topic, user to work object, user to decision record, user to validated external resource, user to decision work flow, user to decision data structure, user role to user, user role to channel, user role to topic, user role to work object, user role to decision record, user role to validated external resource, user role to decision work flow, user role to decision data structure, and the like may be represented in a work graph which may be surfaced to the decision record system 214. The decision record system 214 may query the decision record database 210 according to a variety of queries related to how close the user and the channel are in the work graph. For example, queries such as "popular with user's channel members," "viewed by the user," "most viewed by the user," and the like may be used to generate and transmit a decision record request to one or more client devices and for transmitting a group-based communication decision record and/or group-based communication summary interface to one or more client devices or storing a group-based communication decision record.

In some embodiments, the work graph is a graph-based knowledge representation data structure applied to the group-based communication system data corpus that comprises relationships between users, between various data objects, such as between work objects, between users and work objects, between group-based communication channels and work objects, between topics and work objects, between users and group-based communication channels, between users and topics, between group-based communication channels and topics, between group-based communication channels, between topics, and/or the like. Attributes of work graph data may be represented as nodes while associations between such attributes are represented as edges. Work graph data may be used as machine learning (ML) structure inputs for training and/or utilizing ML structures (e.g., logistic regressions, neural networks, etc.). The group-based communication system may utilize work object metadata, channel metadata, and/or ML structures to rank work objects, users, channels, and/or the like for a variety of applications. For example, such applications may include prioritizing users within a group-based communication channel, such as by identifying and categorizing users with a participant status within a group-based communication channel.

In some embodiments, the group-based communication system data corpus refers to a collection of data that has been received by a group-based communication system through group-based communication interfaces. In some embodiments, a group-based communication system data corpus may comprise one or more of a group-based communication data work objects, group-based communication messages, group-based communication channels, and user profiles associated with the group-based communication system.

In one embodiment, each group-based communication summary interface may be displayed with the approver's name and the timestamp of when the decision record was first created, transmitted, or stored. Additionally, each group-based communication summary interface may further include the group-based communication feed identifier from which the decision record was created, transmitted, or stored such that when a user selects a group-based communication summary interface such as clicking on the group-based communication summary interface indicator within the group-based communication interface, the group-based communication interface may cause to render for display the group-based communication feed from which the decision record was generated.

Figure 8:
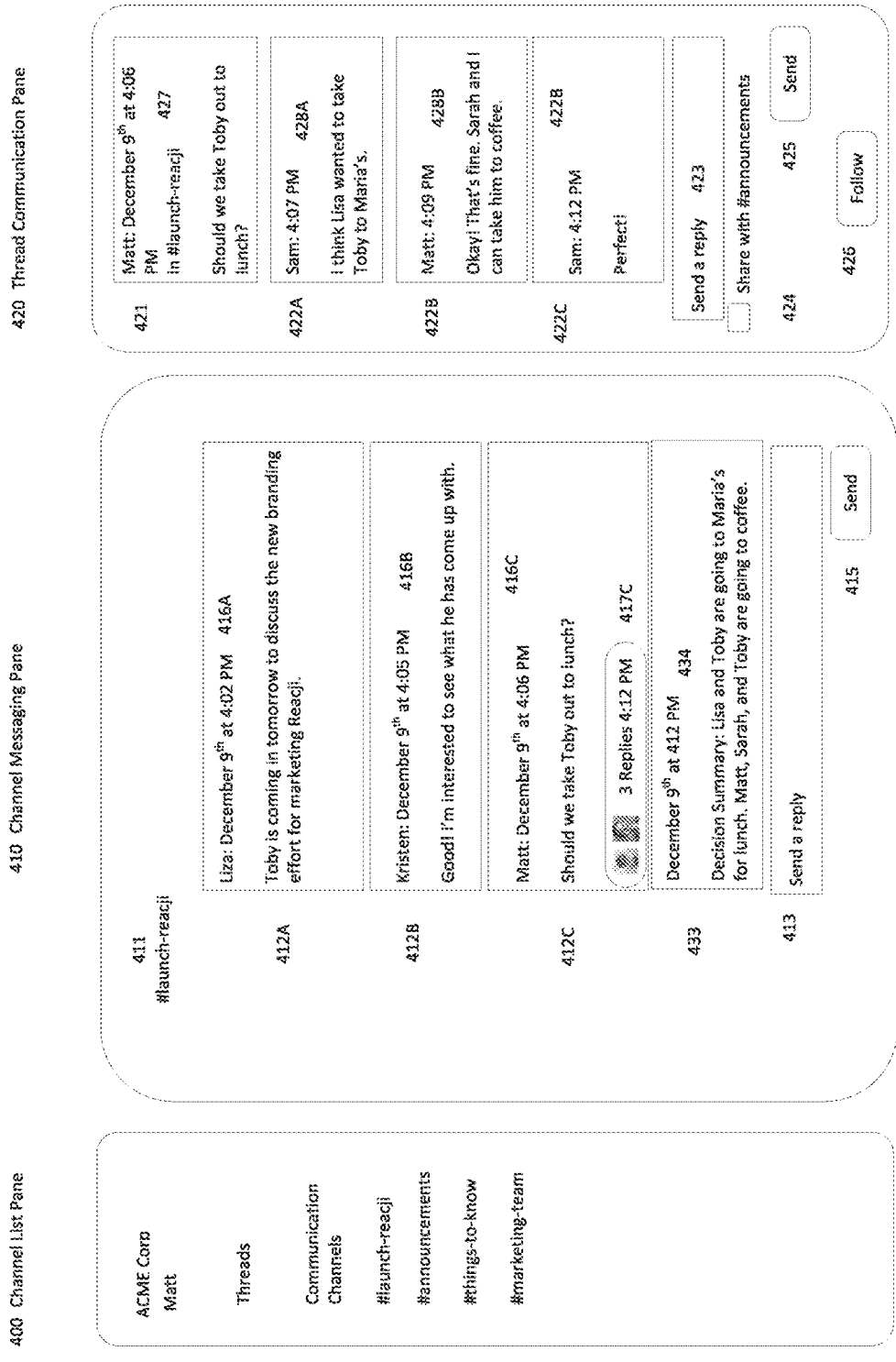
FIG. 8 illustrates an example group-based communication interface displaying a group-based communication decision record in accordance with some embodiments discussed herein.

The group-based communication decision record may be transmitted and stored to the user's client device when the group-based communication summary interface is to be presented for display on the user's computing device via the group-based communication interface 400 as shown, for example, in FIG. 8.

Figure 4:
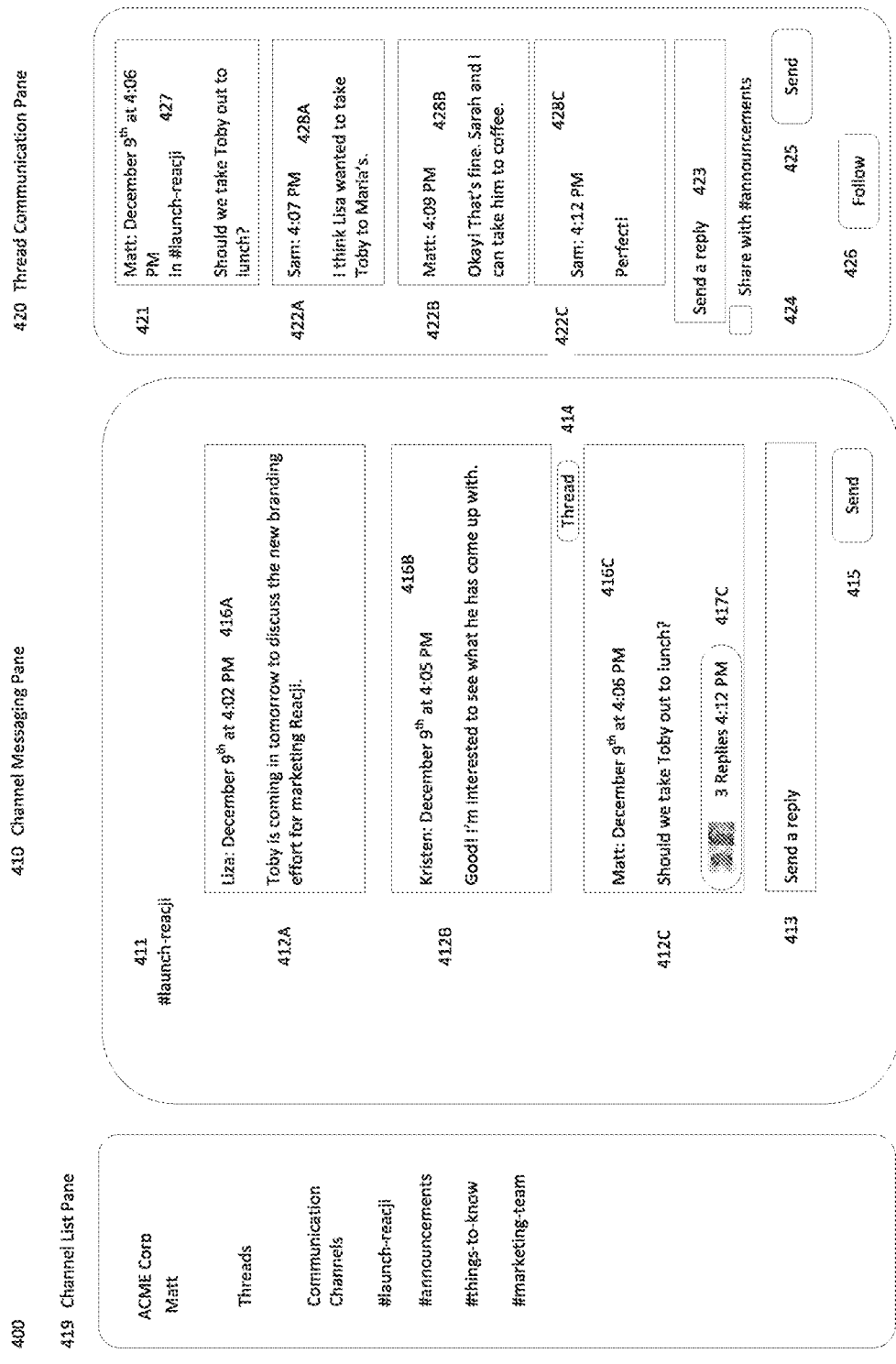
FIG. 4 illustrates an example group-based communication interface displaying a group-based communication channel and thread in accordance with some embodiments discussed herein.

FIG. 4 illustrates an example group-based communication interface 400 having a channel list pane 419, channel messaging pane 410, and thread communication pane 420 in accordance with some embodiments discussed herein. The channel list pane 400 includes a thread indication 402, communication channel indications 403 (e.g., identifying channels that the member follows), the name of the group 401A ("ACME Corp"), and the name of the particular member 401B ("Matt") viewing the interface. As shown in FIG. 4, the selected group-based communication interface may be configured to display the channel list pane, channel messaging pane, and thread communication pane simultaneously.

The channel messaging pane 410 includes a selected group-based communication channel 411 ("launch-reacji") which includes a feed of group-based messaging communications 412A-412C. Each group-based messaging communication 412A-412C includes messaging communication information 416A-416C. The messaging communication information 416A-416B includes a profile identifier and the timestamp of the respective group-based messaging communication. The channel messaging pane 410 may include other identifying information for the group-based communication channel (e.g., date of creation, time of last messaging communication, members of communication channel, etc.).

As shown in FIG. 4, the channel messaging pane 410 also includes a channel communication input register 413 and a channel messaging actuator 415. The channel communication input register 413 is configured to receive group-based messaging communications from a member to be displayed in the selected group-based communication channel displayed in the channel messaging pane 410. The channel messaging actuator 415 (e.g., a button) can be selected by a member and initiates transmission of the group-based messaging communication inserted into the channel communication input register 413 to the circuitry 200 for processing. The group-based messaging communication is then displayed in the channel messaging pane 410.

As also shown in FIG. 4, the channel messaging pane 410 includes a thread actuator 414. The thread actuator 414 is configured to initiate a thread request to create a thread in the thread communication pane 420. The thread actuator 414 shown in FIG. 4 is associated with the selected group-based messaging communication 412C; however, each group-based messaging communication of a group-based communication channel may have a thread actuator associated with the communication. Thus, threads can be created from any group-based messaging communication of a group-based communication channel in a channel messaging pane. In the embodiment illustrated in FIG. 4, the thread actuator 414 is displayed when a member touches or moves a cursor over the selected group-based messaging communication 412C. The thread actuator 414 can be selected to create a thread that will be presented in the thread communication pane 420. In the embodiment illustrated in FIG. 4, a thread has been created from the selected group-based messaging communication 412C (as shown for instance by the thread summary indicator 417C) that is displayed in the thread communication pane 420. The thread was initiated by a member selecting the thread actuator 414, which initiated a thread request. Should the member select the thread actuator 414 a second time, the thread would simply appear in the thread communication pane 420. Subsequent group-based messaging communications may include respective thread actuators, which upon selection create another thread.

In the embodiment illustrated in FIG. 4, the thread summary indicator 417C includes the number of thread communication messages received in the respective thread ("3 Replies") (i.e., the thread count), a profile identifier (e.g., avatar) associated with the member who submitted the thread communication message(s), and include a latency indicator ("10:35 AM") that indicates the time of receipt for the latest thread communication message in the thread. Such information can be beneficial to members of the group-based communication channel in determining whether to access and view the thread. A variety of information can be displayed in the thread summary indicators.

The thread summary indicator 417C can be configured as a selected thread view actuator to initiate a selected thread view request. The selected group-based communication interface is configured to receive selected thread view requests and in response to receipt of selected thread view requests, present a thread communication pane (e.g., thread communication pane 420) displaying the selected thread associated with the selected thread view request. For instance, in the embodiment illustrated in FIG. 4, thread summary indicator 417C is configured as a selected thread view actuator to initiate a selected thread view request upon selection by a member to view the full thread stemming from the selected group-based messaging communication 412C associated with the thread summary indicator 417C, as is shown in the thread communication pane 420.

The thread communication pane 420 includes a subsidiary channel-based thread communication 421 associated with the selected group-based messaging communication 412C of the group-based communication channel from which the displayed thread was created. The thread communication pane 420 also includes thread communication messages 422A-422C. Each of the thread communication messages 422A-422C and the subsidiary channel-based thread communication 421 includes messaging communication information 427 and 428A-428B. The messaging communication information 427 and 428A-428C includes a profile identifier and the timestamp of the respective messaging communication. The messaging communication information 427 also includes the name of the group-based communication channel from which the thread was created (e.g., "launch-reacji"). In some embodiments, the name of the group-based communication channel can be configured as a selected channel view actuator to initiate a selected channel view request. The selected group-based communication interface is configured to receive selected channel view requests and in response to receipt of selected channel view requests, present a channel messaging pane displaying the selected group-based communication channel associated with the selected channel view request.

The thread communication pane 420 also includes a thread communication input register 423, a share actuator 424, a thread messaging actuator 425, and a follow/unfollow actuator 426. The thread communication input register 423 is configured to receive thread communication messages from a member. The thread messaging actuator 425 (e.g., a button) can be selected by a member and initiates transmission of the thread communication message inserted into the thread communication input register 423 to the circuitry 200 for processing. In some embodiments, the thread messaging actuator 425 may be hidden until a member enters information in the thread communication input register 423. The thread messaging actuator 425 may then be displayed and selected by a member. The thread communication message is then displayed in the thread communication pane 420.

The follow/unfollow actuator 426 in the thread communication pane 420 is selectable by a member of the group-based communication channel from which the thread was created and initiates a request to either follow the respective thread or unfollow the respective thread. The selected group-based communication interface is configured such that a thread request (i.e., requesting the creation of a thread) initiates a follow request associated with the member who created the selected group-based messaging communication from which the thread was created and the member who initiated the thread request. Other members of the selected group-based communication channel from which the thread was created can follow the thread by selecting the follow/unfollow actuator 426. In other embodiments, a profile identifier can be configured to initiate a follow request for the member associated with the profile identifier.

The group-based communication interface will present a thread indication (e.g., thread indication 402) in the channel list pane 419. In response to a follow request, the thread indication 402 is configured to indicate that the follow request was received. The group-based communication interface will update the thread summary communication pane to include the respective thread. In some embodiments, the thread summary communication pane is a display pane that is configured to display a summary of threads that the particular member follows. The summary typically includes at least a portion of one or more thread communication messages as well as at least a portion of the selected group-based messaging communications from which the thread was created. The thread summary communication pane may also display various notifications, actuators, and indicators/indications. A channel messaging pane is a display pane configured to display a selected group-based communication channel and may display a variety of information and a variety of notifications, actuators, and indicators/indications. A summary pane is a display pane that is configured to display select data objects associated with a select group-based communication feed in a defined area while the select group-based communication feed is displayed. The group-based communication decision summary interface or a plurality of group-based communication decision summary interfaces may be displayed in one or more display panes, such as the channel list pane, thread communication pane, thread summary communication pane, channel messaging pane, summary pane, etc.

The group-based communication interface will highlight the thread indication if new thread communication messages are received in the followed thread. The follow/unfollow actuator 426 may also be modified to display "unfollow" (e.g., as shown in FIG. 8) in response to receiving the follow request. In response to an unfollow request, the group-based communication interface will modify the thread indication in the channel list pane by updating the thread summary communication pane to remove the respective thread. The group-based communication interface will no longer highlight the thread indication if new thread communication messages are received in the unfollowed thread. The follow/unfollow actuator 426 may also be modified to display "follow" in response to receiving the follow request (e.g., as shown in FIG. 4).

As shown in FIG. 4, the thread communication pane 420 includes a subsidiary channel-based thread communication 421 and thread communication messages 422A-422C. The group-based communication system 105 may analyze the communication messages (e.g., the subsidiary channel-based thread communication 421 and the thread communication messages 422A-422C) to identify one or more decision identifiers. The group-based communication system 105 may analyze the messages by parsing the text, identifying keywords, and associating such keywords with data stored in the decision record database 210. For instance, as shown in FIG. 4, the group-based communication system 105 may identify the keyword "Perfect" as a decision identifier. The keyword "perfect" may be previously stored in the decision record database 210 as a keyword commonly used by certain client devices (e.g., the client device associated with "Sam") or by client devices in general to indicate that a decision has been made. The group-based communication system 105 may use machine learning to identify decision identifiers.

The group-based communication system 105 may also identify timestamps associated with each of the plurality of group-based communication messages (e.g., subsidiary channel-based thread communication 421 and thread communication messages 422A-422C) to identify a hierarchy of decision identifiers and thus, generate a decision record request based on the hierarchy. For instance, as shown in FIG. 4, the keyword "Okay" may be identified as a decision identifier. However, since "Perfect" is associated with a timestamp later in time than "Okay", the group-based communication system 105 would generate the decision record request based on the text following "Okay" and prior to "Perfect" as supplementing any contrary text received prior to "Okay."

Figure 5:
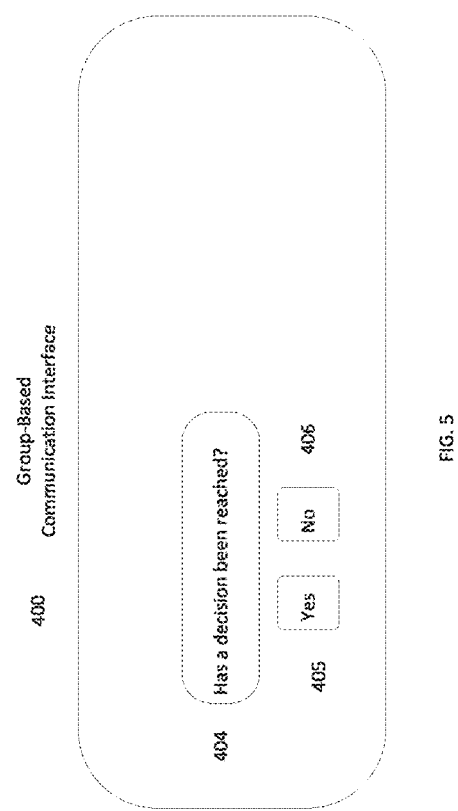
FIG. 5 illustrates an example group-based communication interface displaying a decision record request in accordance with some embodiments discussed herein.

FIG. 5 illustrates a decision record request generated and transmitted for display by the group-based communication system 105 on the group-based communication interface 400. As shown in FIG. 5, in this embodiment, the decision record request 404 includes an approval actuator 405 and a disapproval actuator 406. A client device in receipt of the decision record request 404 may select either of the approval actuator 405 or the disapproval actuator 406 to result in a group-based communication decision record response being transmitted to the group-based communication system 105. If the group-based communication decision record response includes an approval of the decision record request 404, the group-based communication system 105 may generate, store, and/or transmit a group-based communication decision record.

Figure 6:
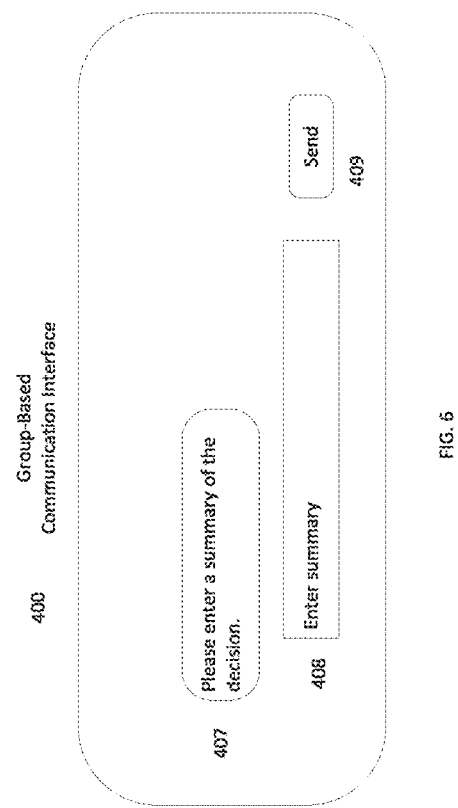
FIG. 6 illustrates an example group-based communication interface displaying a draft decision record request in accordance with some embodiments discussed herein.

In some embodiments, such as shown in FIG. 6, if the group-based communication decision record response includes an approval of the decision record request 404, the group-based communication system 105 may generate and transmit to the approving client device a draft decision record request 407 requesting the client device to generate a group-based communication decision record. As shown in FIG. 6, when a draft decision record request 407 is displayed on a group-based communication interface 400, a summary input register 408 and a summary send actuator 409 may also be displayed for entering the group-based communication decision record.

Figure 7:
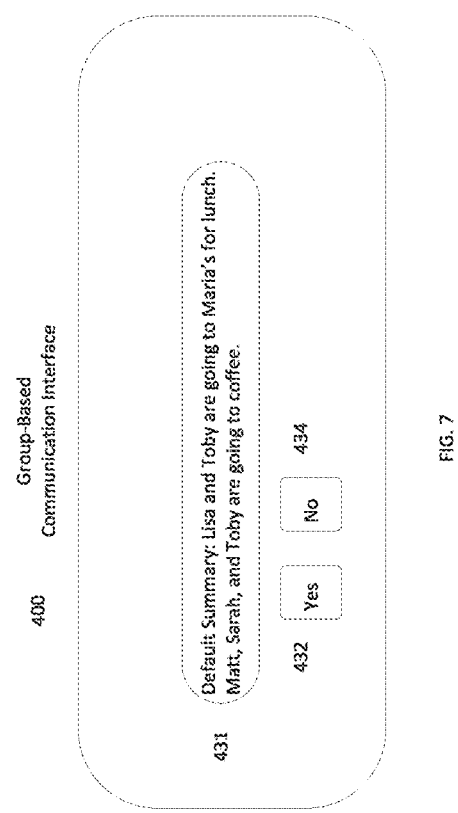
FIG. 7 illustrates an example group-based communication interface displaying a draft group-based communication decision record in accordance with some embodiments discussed herein.

In some embodiments, such as shown in FIG. 7, if the group-based communication decision record response includes an approval of the decision record request 404, the group-based communication system 105 may generate and transmit to the approving client device a draft group-based communication decision record 431 for editing by the client device. As shown in FIG. 7, draft approval actuator 432 and draft disapproval actuator 434 may also be displayed for approving the draft group-based communication decision record 431. In some embodiments, the group-based communication system 105 may also transmit for display a revised draft input register (not illustrated) for entering a revised draft group-based communication decision record. Variations may be available for modifying the group-based communication decision record.

Once the group-based communication decision record is approved, the group-based communication decision summary interface 433 may be displayed in the group-based communication interface 400. FIG. 8 illustrates the display of a group-based communication decision summary interface 433 in the channel messaging pane 410. As shown in FIG. 8, members of the group-based communication channel 411 can view the group-based communication decision summary interface 433 while not needing to read each of the plurality of group-based communication messages (e.g., subsidiary channel-based thread communication 421 and thread communication messages 422A-422C) from which the decision record is based and without needing to open the thread communication pane 420. Thus, the relevant information is provided to any client device that is a member of the group-based communication channel 411.

In some embodiments, the group-based communication system 105 may continue to monitor group-based communication messages for additional decision identifiers and may modify group-based communication decision records and/or group-based communication summary interfaces 433 based on the additional decision identifiers. For instance, in the embodiment illustrated in FIG. 4, the keyword "Okay" was transmitted for display prior to the transmission of "Perfect." In such case, the group-based communication system 105 may identify the keyword "Okay" and generate and transmit a decision record request based on this keyword. A decision record may be generated based on the context around the keyword "Okay." Once the keyword "Perfect" is received and identified by the group-based communication system 105 as a decision identifier, the group-based communication system 105 may generate and transmit a second decision record request based on this new keyword and the context around the keyword. A second decision record may be generated in place of the first decision record or in addition to the first decision record, and a second group-based communication summary interface may be transmitted for display in place of the first group-based communication summary interface or in addition to the first group-based communication summary interface.

Figure 10:
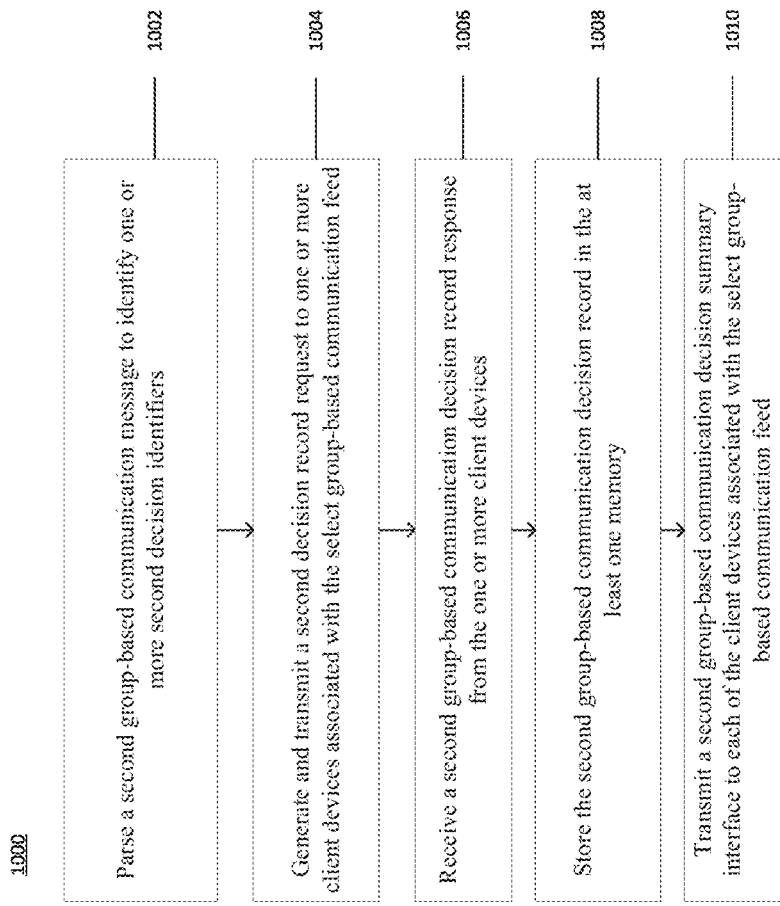
FIG. 10 illustrates a flow diagram of an example group-based communication system in accordance with some embodiments discussed herein.

FIG. 10 illustrates method 1000 where a second group-based communication decision record is generated and transmitted for display on the group-based communication interface. The method 1000 includes parsing a second group-based communication message to identify one or more second decision identifiers 1002, generating and transmitting a second decision record request to one or more client devices associated with the select group-based communication feed 1004, receiving a second group-based communication decision record response from the one or more client devices 1006, storing the second group-based communication decision record in the at least one memory 1008, and transmitting a second group-based communication decision summary interface to each of the client devices associated with the select group-based communication feed 1010.

In some embodiments, the group-based communication system 105 may also generate and/or identify one or more decision data structures. Once the decision data structures are identified and/or generated, the work objects may be transmitted to one or more client devices and/or one or more validated external resources 103. In some embodiments, the group-based communication system 105 may perform the instructions comprised in the decision data structure. For instance, in the embodiment illustrated in FIG. 8, the group-based communication system 105 may parse the group-based communication messages (e.g., subsidiary channel-based thread communication 421 and thread communication messages 422A-422C) and identify the keywords "lunch" and "coffee" as well as "Maria's", "Lisa," and "Sarah." The group-based communication system 105 may determine that, based on data stored in the decision record database 210, these keywords may be associated with future events. The group-based communication system 105 may identify the keywords as decision identifiers associated with decision data structures. The group-based communication system 105 may then generate and/or identify decision data structures associated with such keywords and perform instructions in the decision data structures. For instance, in the embodiment illustrated in FIG. 8, the group-based communication system 105 may generate one or more event occurrence data structures leading to the creation of one or more emails to the relevant client devices and/or validated external resources, one or more calendar objects associated with the client devices and/or validated external resources, or other such work objects.

In some embodiments, the group-based communication system 105 may identify a participant status of one or more client devices and base the decision record request and subsequent group-based communication decision record on the respective participant status of the client device. For instance, in the embodiment illustrated in FIG. 8, the group-based communication system 105 may identify the client device associated with "Matt" as having an inferior status to the client device associated with "Sam." For instance, the client device associated with "Matt" may be associated with a manager of the team, while the client device associated with "Sam" may be associated with an assistant of the team. Based on these participant statuses, the group-based communication system 105 may transmit a decision record request to the client device associated with "Sam" rather than the client device associated with "Matt." In some embodiments, the group-based communication system 105 may not transmit a decision record request until the group-based communication system 105 receives a decision identifier from the client device associated with "Sam." In some embodiments, if the group-based communication system 105 determines that there is a conflict in decision identifiers, then the group-based communication system 105 may base the group-based communication decision record or draft group-based communication decision record on the decision identifier associated with the highest ranking client device associated with a decision identifier.

Figure 13:
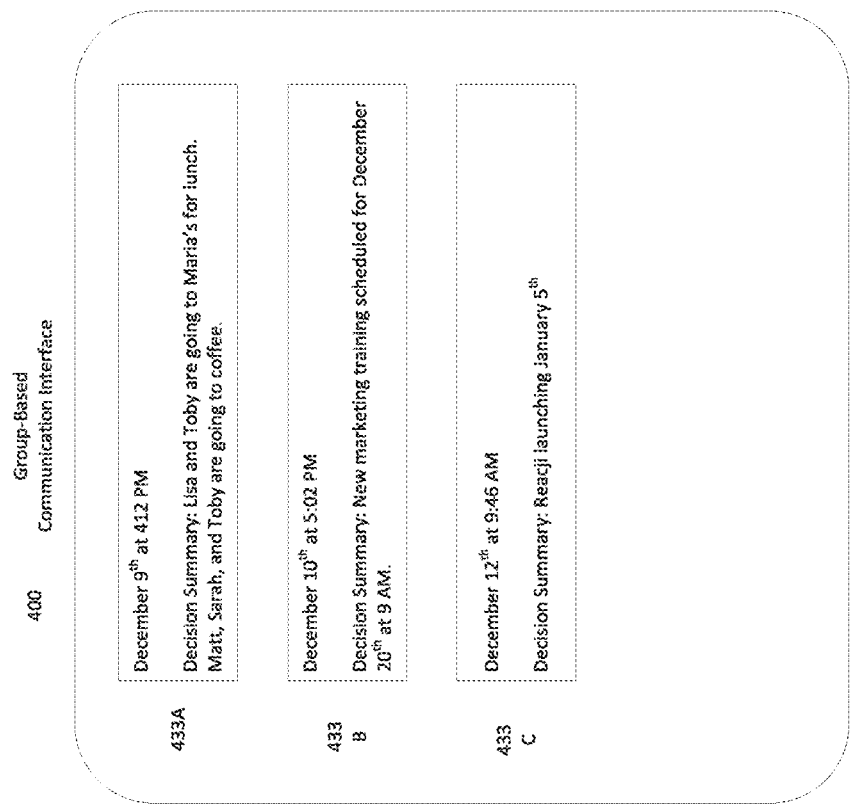
FIG. 13 illustrates an example group-based communication interface displaying a plurality of group-based communication decision records in accordance with some embodiments discussed herein.

In some embodiments, the group-based communication system 105 may transmit for display a plurality of group-based communication summary interfaces. For instance, as shown in FIG. 13, a plurality of group-based communication summary interfaces 433A-433C are displayed in the group-based communication interface 400. The group-based communication system 105 may organize and collect the plurality of group-based communication summary interfaces 433A-433C based on the user's preferences—e.g., a hierarchy of decision records associated with particular users, groups, channels, threads, etc. The group-based communication system 105 may display the plurality of group-based communication summary interfaces 433A-433C at certain periods of time, after a predetermined period of time, or on a recurring basis based on the user's preferences.

The group-based communication decision summary interface 433 (and plurality of group-based communication summary interfaces 433A-433C) may be configured as user engageable links providing access to the plurality of group-based communication messages from which the decision record was generated. For instance, the group-based communication decision summary interface 433 (and plurality of group-based communication summary interfaces 433A-433C) may be configured as an actuator that when selected initiates a request to view the associated plurality of group-based communication messages from which the decision record was generated.

In the embodiments illustrated in FIGS. 4-8, various identifiers were displayed. These identifiers may be formatted in a variety of configurations with any suitable image or visual object including animated object, text, or other form to identify the associated content.

In some example embodiments, the group-based communication interface 400 may further provide, although not shown, levers, knobs, buttons, etc. arranged in one or more standard configurations to provide control of adjustable filtering parameters such as selection for the most recent decision record, decision records within a specific timespan, or a diversified set of decision records.

Additionally or alternatively, the decision record system 214 may make a recommendation of any topic or group-based communication channel to follow or create to the user based on the group-based communication decision summary interface 433. For example, the decision record system 214 can make a recommendation of a channel to a user based on similarities between a plurality of group-based communication summary interfaces 433. The decision record system 214 can make multiple suggestions as well as rank or order the suggestions in terms of their relevance to the user associated with the group-based communication decision summary interface 433.

In some embodiments, the group-based communication system 105 may allow a client device 101A-101N to modify, delete, or store the group-based communication decision summary interface 433, such as by adding or removing text, adding or removing work objects, deleting the group-based communication decision summary interface 433, or saving the group-based communication decision summary interface 433. For instance, the group-based communication decision summary interface 433 may be stored in the group-based communication system 105 such that future access of the respective group-based communication channel 411 may initiate the retrieval and display of the electronic group-based communication decision summary interface 433. All or a portion of the group-based communication decision summary interface 433 may be stored in the group-based communication system 105 and associated with the respective group-based communication channel 411 for future use.

In some embodiments, one or more summary interfaces 433 may be associated to each other (e.g., superseding decision records). While the latest group-based communication decision summary interface 433 may be displayed, prior group-based communication summary interfaces that were superseded by the latest group-based communication decision summary interface 433 may be stored and associated with the latest group-based communication decision summary interface 433.

Figure 11:
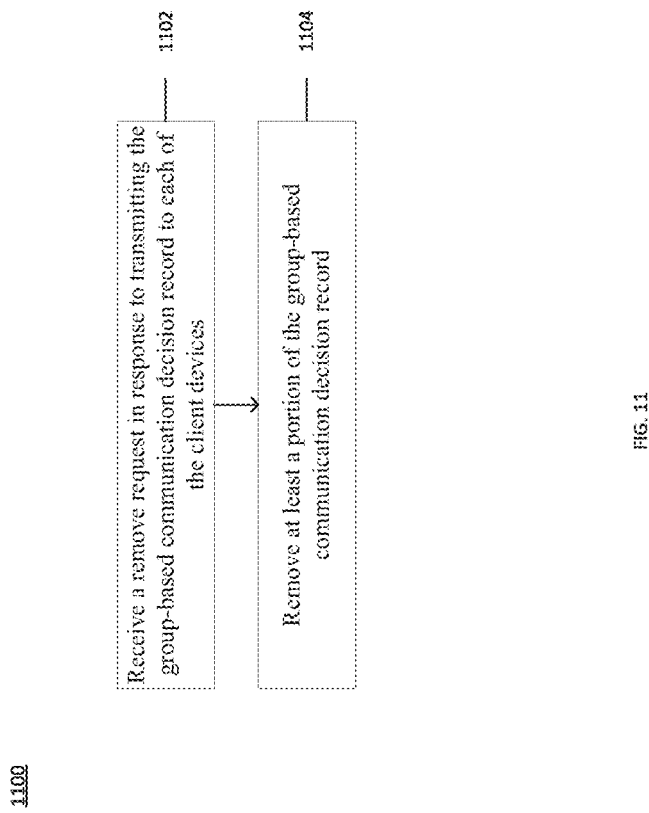
FIG. 11 illustrates a flow diagram of an example group-based communication system in accordance with some embodiments discussed herein.

FIG. 11 illustrates a flow diagram of an example system in accordance with some embodiments discussed herein. In particular, FIG. 11 illustrates method 1100 which includes receiving a remove request in response to transmitting the group-based communication decision record to each of the client devices 1102 and removing at least a portion of the group-based communication decision record 1104. In some embodiments, the method 1100 may also include removing at least a portion of the group-based communication summary interface associated with the group-based communication decision record.

Figure 12:
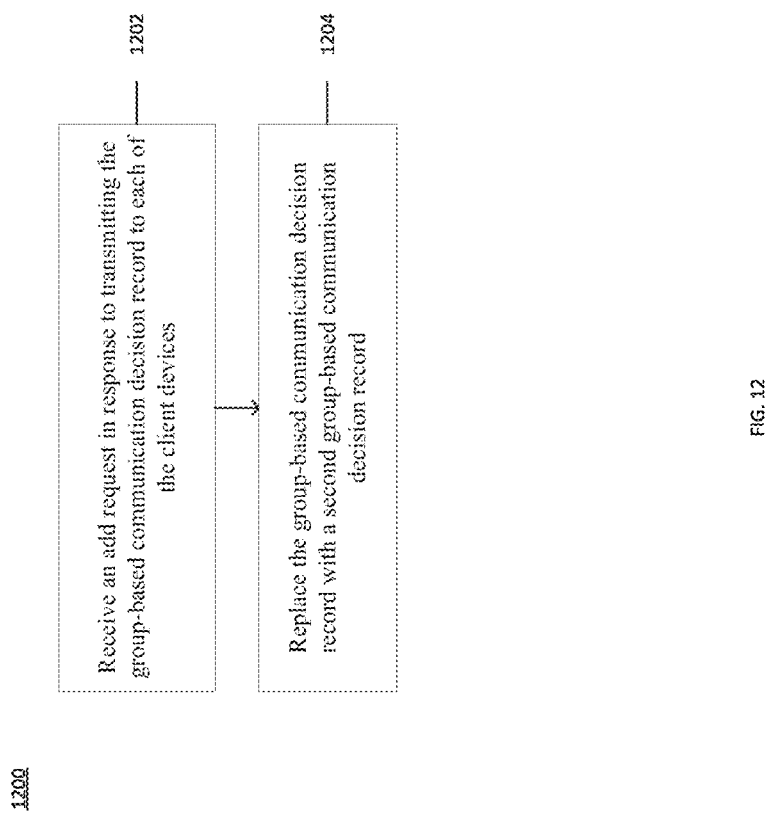
FIG. 12 illustrates a flow diagram of an example group-based communication system in accordance with some embodiments discussed herein.

FIG. 12 illustrates a flow diagram of an example system in accordance with some embodiments discussed herein. In particular, FIG. 12 illustrates method 1200 which includes receiving an add request in response to transmitting the group-based communication decision record to each of the client devices 1202 and replacing the group-based communication decision record with a second group-based communication decision record 1204. For instance, a user may add text, a file, user identifier, group-based communication channel, thread, email, calendar object, etc. to the group-based communication decision record. In some embodiments, the method 1200 may also include replacing the group-based communication summary interface associated with the group-based communication decision record with a second group-based communication summary interface.

FIG. 14 illustrates an exemplary method for identifying decisions and rendering decision records in a group-based communication interface. At block 1402, the system (e.g., one more electronic devices), parses one or more of a plurality of group-based communication messages to identify one or more decisions, wherein the plurality of group-based communication messages is associated with a group-based communication feed and is associated with a group identifier; at block 1404, the system, based on the one or more decisions, generates and transmits a request for confirming the one or more decisions to one or more client devices associated with the select group-based communication feed; at block 1406, the system receives a response from the one or more client devices, wherein the response comprises an approval of the request; at block 1408, the system stores a record of the one or more decisions; at block 1410, the system transmits, for display by each of the client devices, a first summary interface to each of the client devices associated with the group-based communication feed, wherein the first summary interface includes the one or more decisions associated with the record.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus to:
    parse one or more of a plurality of group-based communication messages to identify one or more decisions, wherein the plurality of group-based communication messages is associated with a group-based communication feed and is associated with a group identifier;
    based on the one or more decisions, generate and transmit a request for confirming the one or more decisions to one or more client devices associated with the select group-based communication feed,
    receive a response from the one or more client devices, wherein the response comprises an approval of the request;
    store a record of the one or more decisions; and
    transmit, for display by each of the client devices, a first summary interface to each of the client devices associated with the group-based communication feed, wherein the first summary interface includes the one or more decisions associated with the record.

2. The apparatus of claim 1, wherein the group-based communication feed comprises a group-based communication channel displayed in a first display pane within the group-based communication interface and the group-based communication decision summary interface is displayed in a summary pane as a second display pane.

3. The apparatus of claim 1, wherein the at least one memory and the computer program code are further configured to, with the at least one processor, cause the apparatus to:
    parse a second group-based communication message to identify one or more second decisions, wherein the second group-based communication message is associated with the plurality of group-based communication messages such that the second group-based communication message is associated with the group-based communication feed;
    based on the one or more second decisions, generate and transmit a second request for confirming the one or more second decisions to one or more client devices associated with the group-based communication feed;
    receive a second response from the one or more client devices, wherein the second response comprises an approval of the second request;
    store a second record of the one or more second decisions; and
    transmit, for display by each of the client devices, a second summary interface to each of the client devices associated with the group-based communication feed, wherein the second summary interface includes the one or more decisions associated with the second record.

4. The apparatus of claim 1, wherein parsing the plurality of group-based communication messages to identify one or more decisions is based at least in part on the participant status of one or more of the client devices associated with the group-based communication feed.

5. The apparatus of claim 1, wherein the at least one memory and the computer program code are further configured to, with the at least one processor, further cause the apparatus to:
    in response to receiving a remove request from one or more of the client devices, remove at least a portion of the record.

6. The apparatus of claim 1, wherein the at least one memory and the computer program code are further configured to, with the at least one processor, further cause the apparatus to:
    in response to receiving an add request from one or more of the client devices, replace the record with a second record, wherein the add request includes a request to add data to the record.

7. The apparatus of claim 1, wherein the record is associated with a decision workflow and the at least one memory and the computer program code are further configured to, with the at least one processor, cause the apparatus to:
    in response to storing the record of the one or more decisions, cause the transmission of a work object to one or more validated external resources, wherein the work object is associated with the decision workflow.

8. A method for identifying decisions and rendering decision records in a group-based communication interface, comprising:
    parsing one or more of a plurality of group-based communication messages to identify one or more decisions, wherein the plurality of group-based communication messages is associated with a group-based communication feed and is associated with a group identifier;
    based on the one or more decisions, generating and transmitting a request for confirming the one or more decisions to one or more client devices associated with the select group-based communication feed;

receiving a response from the one or more client devices, wherein the response comprises an approval of the request;

storing a record of the one or more decisions; and transmitting, for display by each of the client devices, a first summary interface to each of the client devices associated with the group-based communication feed, wherein the first summary interface includes the one or more decisions associated with the record.

9. The method of claim 8, wherein the group-based communication feed comprises a group-based communication channel displayed in a first display pane within the group-based communication interface and the group-based communication decision summary interface is displayed in a summary pane as a second display pane.

10. The method of claim 8, further comprising:

parsing a second group-based communication message to identify one or more second decisions, wherein the second group-based communication message is associated with the plurality of group-based communication messages such that the second group-based communication message is associated with the group-based communication feed;

based on the one or more second decisions, generating and transmitting a second request for confirming the one or more second decisions to one or more client devices associated with the group-based communication feed;

receiving a second response from the one or more client devices, wherein the second response comprises an approval of the second request;

storing a second record of the one or more second decisions; and transmitting, for display by each of the client devices, a second summary interface to each of the client devices associated with the group-based communication feed, wherein the second summary interface includes the one or more decisions associated with the second record.

11. The method of claim 8, wherein parsing the plurality of group-based communication messages to identify one or more decisions is based at least in part on the participant status of one or more of the client devices associated with the group-based communication feed.

12. The method of claim 8, further comprising:

in response to receiving a remove request from one or more of the client devices, removing at least a portion of the record.

13. The method of claim 8, further comprising:

in response to receiving an add request from one or more of the client devices, replacing the record with a second record, wherein the add request includes a request to add data to the record.

14. The method of claim 8, wherein the record is associated with a decision workflow and the method further comprises:

in response to storing the record of the one or more decisions, causing the transmission of a work object to one or more validated external resources, wherein the work object is associated with the decision workflow.

15. A non-transitory computer-readable storage medium storing one or more programs, the one or more programs comprising instructions, which when executed by one or more processors of an electronic device cause the electronic device to:

parse one or more of a plurality of group-based communication messages to identify one or more decisions, wherein the plurality of group-based communication messages is associated with a group-based communication feed and is associated with a group identifier;

based on the one or more decisions, generate and transmit a request for confirming the one or more decisions to one or more client devices associated with the select group-based communication feed;

receive a response from the one or more client devices, wherein the response comprises an approval of the request;

store a record of the one or more decisions; and transmit, for display by each of the client devices, a first summary interface to each of the client devices associated with the group-based communication feed, wherein the first summary interface includes the one or more decisions associated with the record.

16. The non-transitory computer-readable storage medium of claim 15, wherein the group-based communication feed comprises a group-based communication channel displayed in a first display pane within the group-based communication interface and the group-based communication decision summary interface is displayed in a summary pane as a second display pane.

17. The non-transitory computer-readable storage medium of claim 15, wherein parsing the plurality of group-based communication messages to identify one or more decisions is based at least in part on the participant status of one or more of the client devices associated with the group-based communication feed.

18. The non-transitory computer-readable storage medium of claim 15, wherein the one or more programs comprise instructions, which when executed by one or more processors of an electronic device further cause the electronic device to:

in response to receiving a remove request from one or more of the client devices, remove at least a portion of the record.

19. The non-transitory computer-readable storage medium of claim 15, wherein the one or more programs comprise instructions, which when executed by one or more processors of an electronic device further cause the electronic device to:

in response to receiving an add request from one or more of the client devices, replace the record with a second record, wherein the add request includes a request to add data to the record.

20. The non-transitory computer-readable storage medium of claim 15, wherein the record is associated with a decision workflow and the one or more programs comprise instructions, which when executed by one or more processors of an electronic device further cause the electronic device to:

in response to storing the record of the one or more decisions, cause the transmission of a work object to one or more validated external resources, wherein the work object is associated with the decision workflow.

* * * * *